(12) United States Patent
Matsuoka

(10) Patent No.: US 7,283,288 B2
(45) Date of Patent: Oct. 16, 2007

(54) SCANNING DEVICE

(75) Inventor: Shohei Matsuoka, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 11/621,718

(22) Filed: Jan. 10, 2007

(65) Prior Publication Data

US 2007/0159675 A1     Jul. 12, 2007

(30) Foreign Application Priority Data

Jan. 11, 2006  (JP)  ............... P2006-003808

(51) Int. Cl.
*G02B 26/08* (2006.01)
(52) U.S. Cl. .................... 359/205; 359/276
(58) Field of Classification Search .................. None
See application file for complete search history.

(56) References Cited

U.S. PATENT DOCUMENTS

| | | | |
|---|---|---|---|
| 6,542,278 B2 * | 4/2003 | Kato | ............. 359/205 |
| 6,859,295 B2 | 2/2005 | Matsuoka | |
| 2004/0257429 A1 | 12/2004 | Iizuka et al. | |

FOREIGN PATENT DOCUMENTS

JP           7-146437           6/1995

OTHER PUBLICATIONS

English Language Abstract of JP 7-146437.
U.S. Appl. No. 11/548,464 to Matsuoka, filed Oct. 11, 2006.
U.S. Appl. No. 11/550,058 to Matsuoka, filed Oct. 17, 2006.

* cited by examiner

*Primary Examiner*—James Phan
(74) *Attorney, Agent, or Firm*—Greenblum & Bernstein, P.L.C.

(57) ABSTRACT

According to an aspect of the invention, there is provided a scanning device, which is provided with a light source unit that emits a light beam, a collection optical system that converges the light beam emitted by the light source unit principally in an auxiliary scanning direction, a deflector that deflects the light beam converged by the collection optical system, an image forming optical system that converges the light beam deflected by the deflector onto a scan target surface to form a beam spot scanning in a main scanning direction which is perpendicular to the auxiliary scanning direction. In this configuration, the scanning device satisfies a following condition:

$$-1 < S_1 - S_2 < 1 \qquad (A)$$

where $$S_1 = \frac{(y_{1\_max} - y'_{1\_max})^2}{(y_{1\_0} - y'_{1\_0})^2} \times \frac{\left(\frac{1}{L_1} + \frac{1}{L\cos\theta}\right)^2}{\left(\frac{1}{L_1} + \frac{1}{L}\right)^2},$$

$$S_2 = \frac{(y_{2\_max} - y'_{2\_max})^2}{(y_{2\_0} - y'_{2\_0})^2} \times \frac{\left(\frac{1}{L_1} + \frac{1}{L\cos\theta}\right)^2}{\left(\frac{1}{L_1} + \frac{1}{L}\right)^2}.$$

11 Claims, 11 Drawing Sheets

FIG.3A  FIG.3B  FIG.3C
        
S1 − S2 = −1    S1 − S2 = 0    S1 − S2 = 1
FIG.3D  FIG.3E  FIG.3F
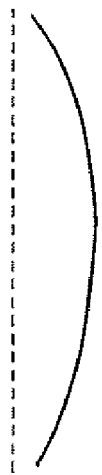        
S1 = 0    S1 = 1    S1 = 2
- - - - - - - DESIGN IMAGE PLANE  
——— IMAGE PLANE IN THE CASE OF SHAPE ERROR  } (MAIN SCANNING DIRECTION)

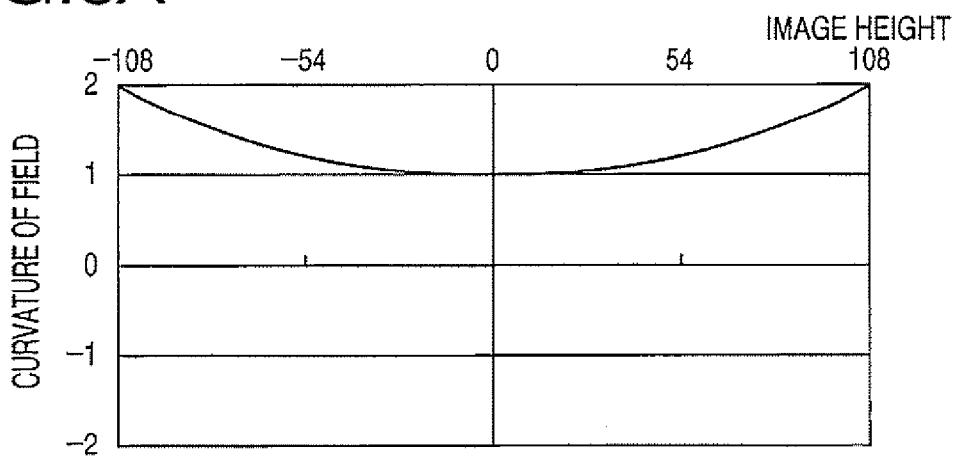
FIG.6A  1st EXAMPLE   1st SURFACE
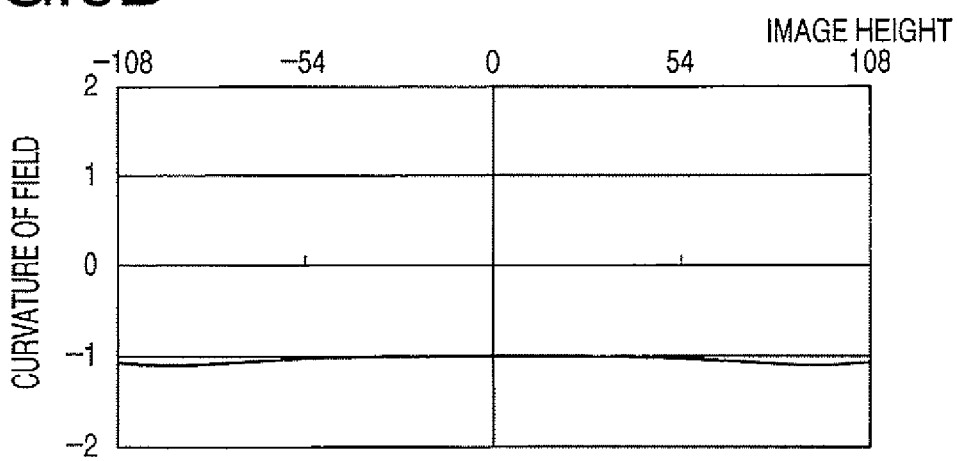
FIG.6B  1st EXAMPLE   2nd SURFACE
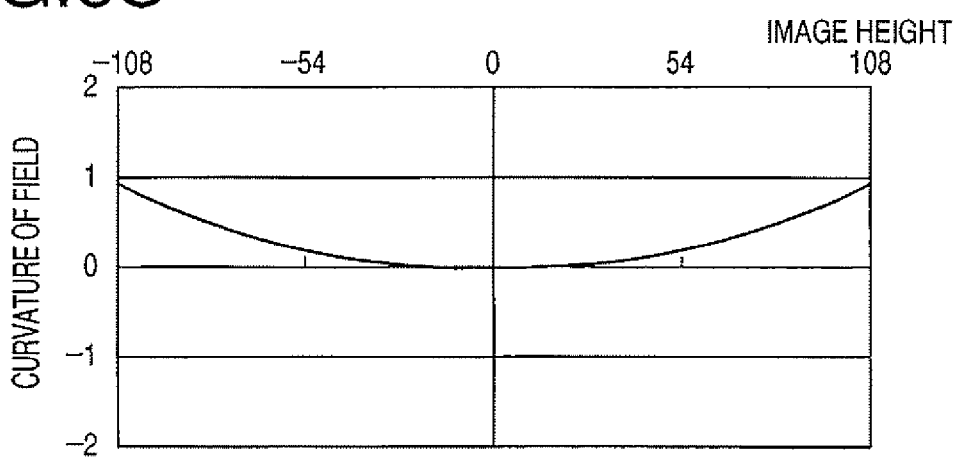
FIG.6C  1st EXAMPLE   TOTAL

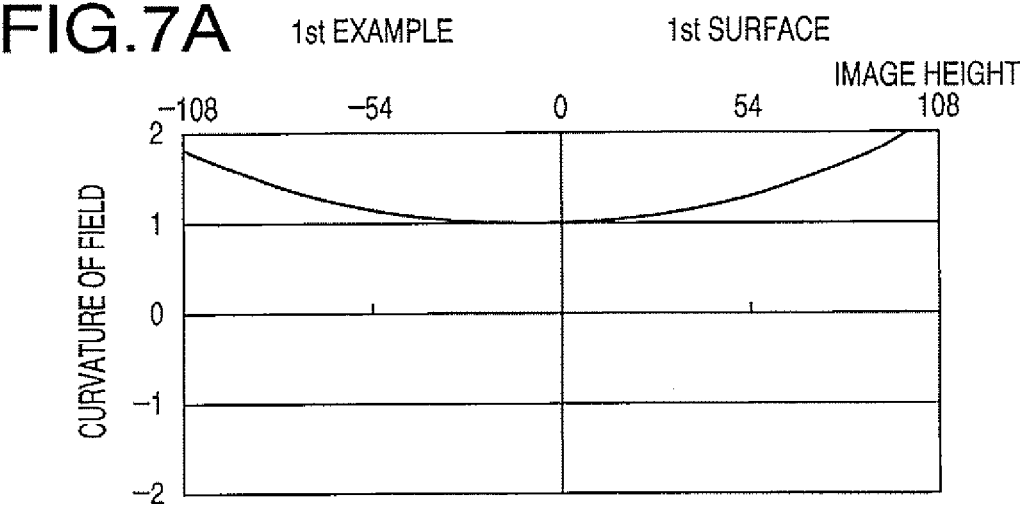
FIG.7A  1st EXAMPLE  1st SURFACE
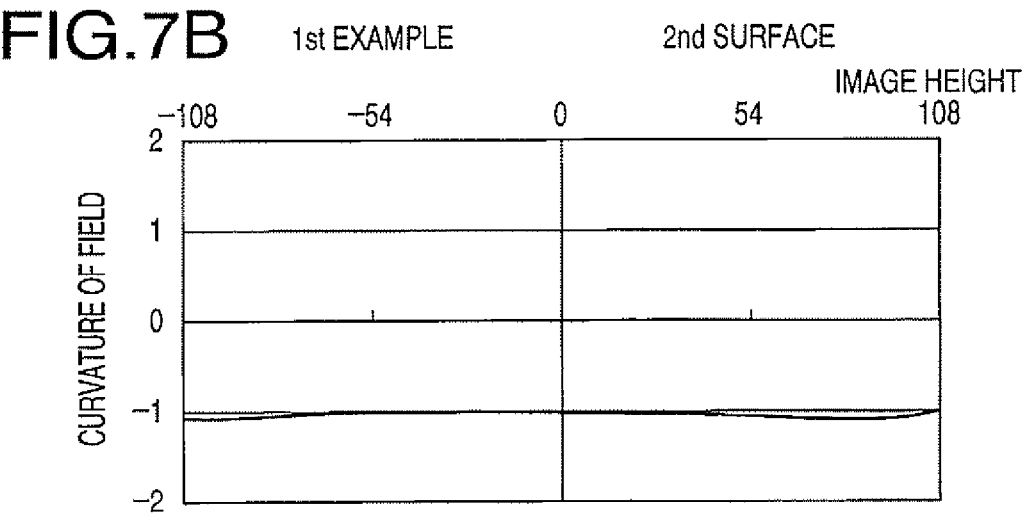
FIG.7B  1st EXAMPLE  2nd SURFACE
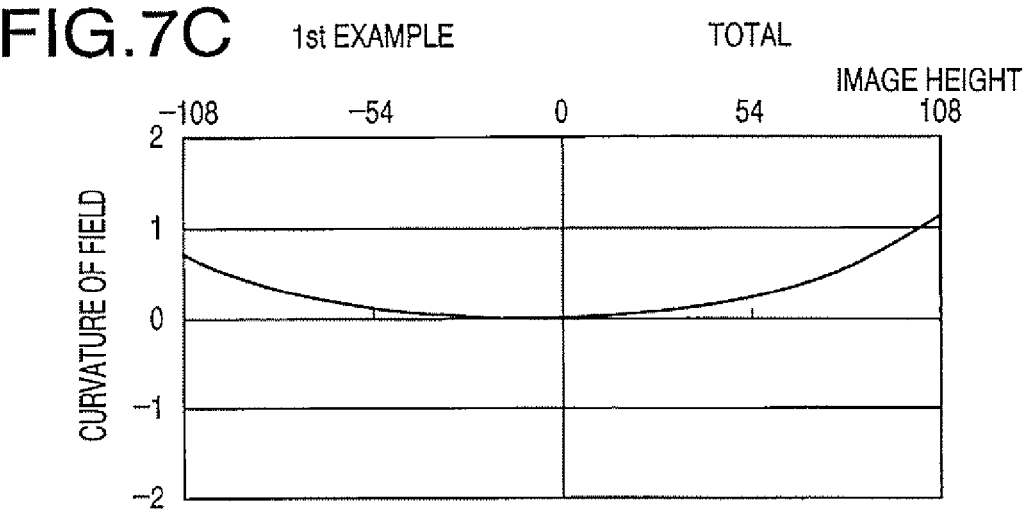
FIG.7C  1st EXAMPLE  TOTAL

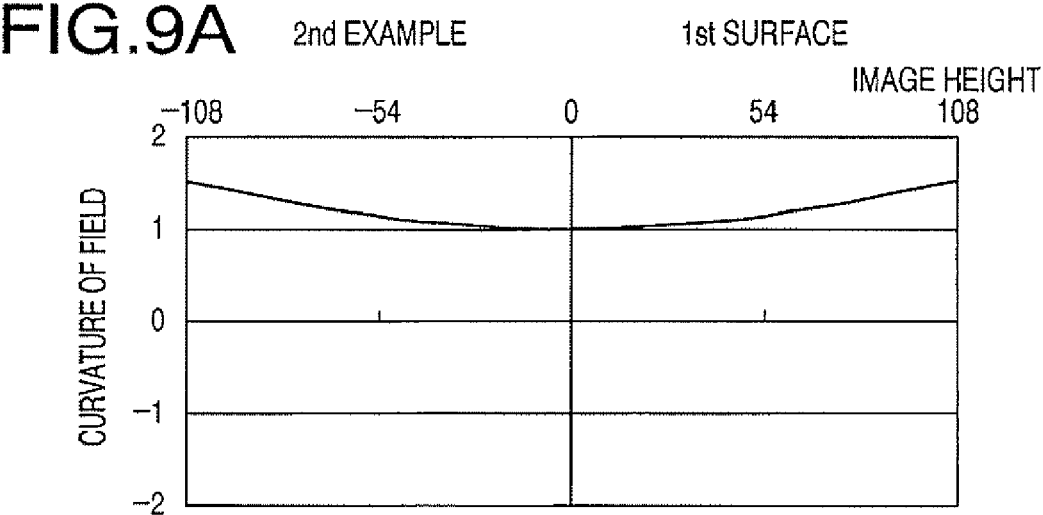
FIG.9A 2nd EXAMPLE 1st SURFACE
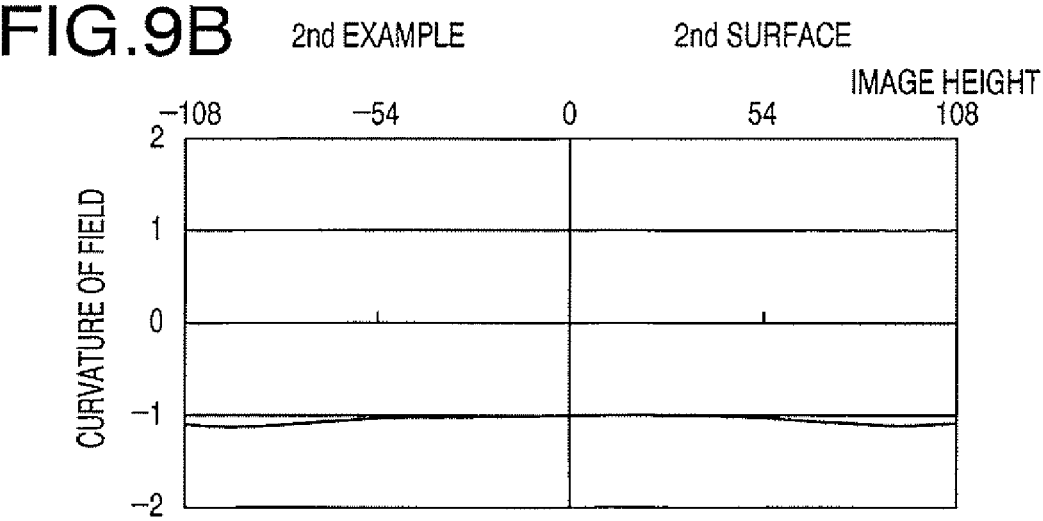
FIG.9B 2nd EXAMPLE 2nd SURFACE
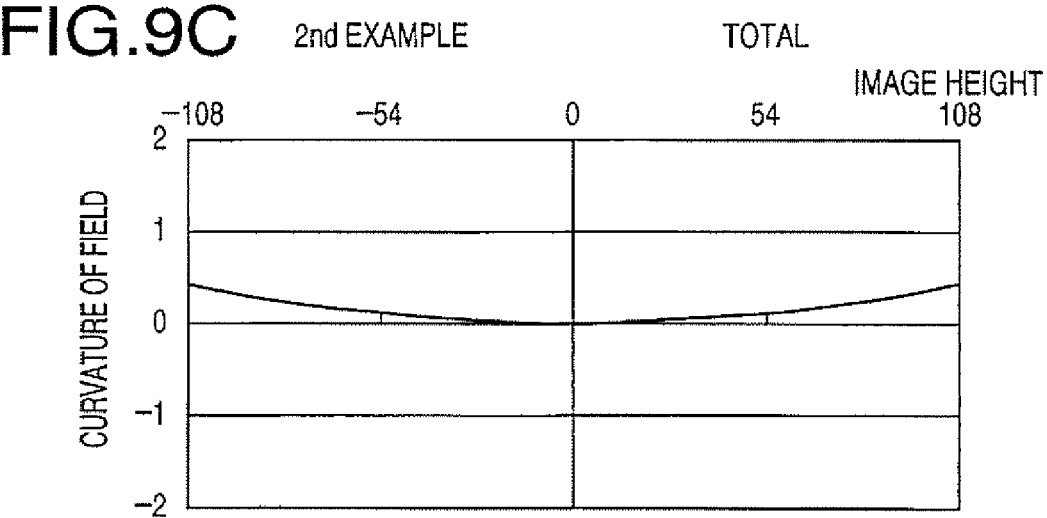
FIG.9C 2nd EXAMPLE TOTAL

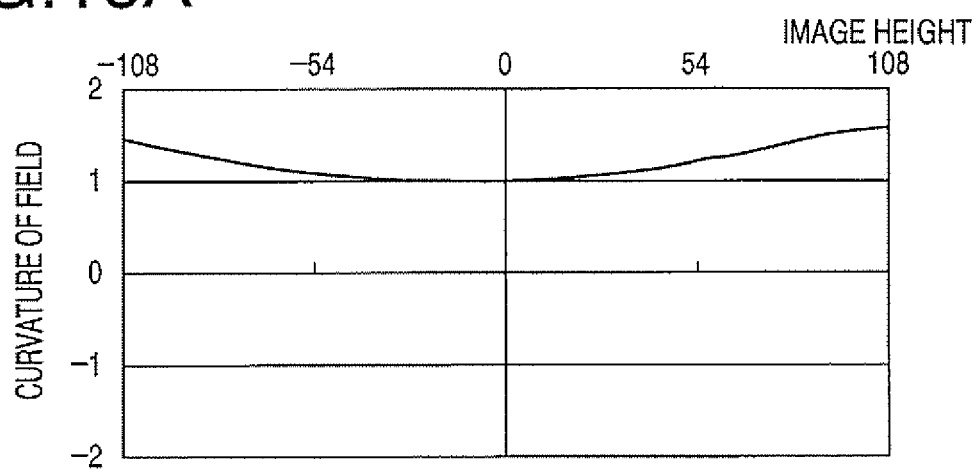
FIG.10A  2nd EXAMPLE    1st SURFACE
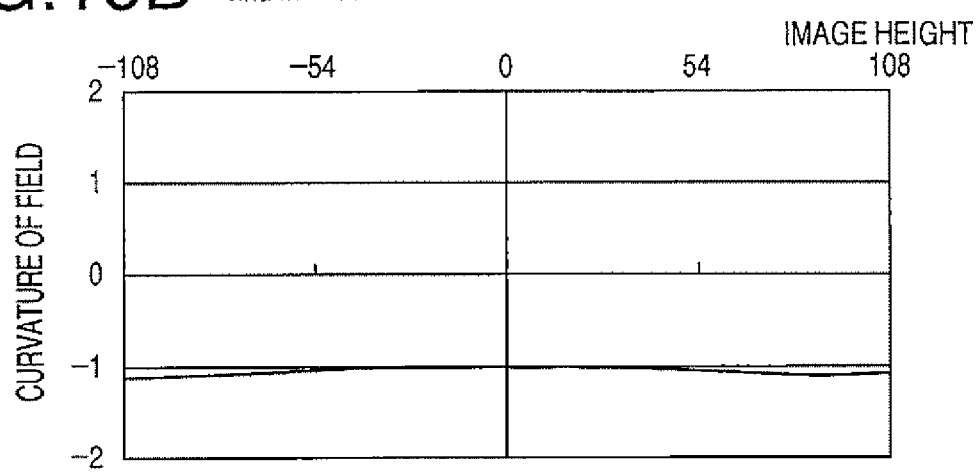
FIG.10B  2nd EXAMPLE    2nd SURFACE
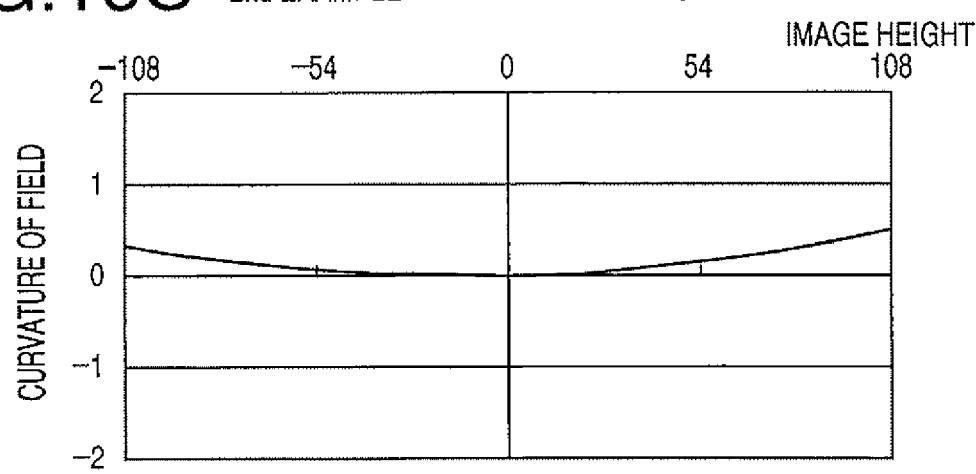
FIG.10C  2nd EXAMPLE    TOTAL

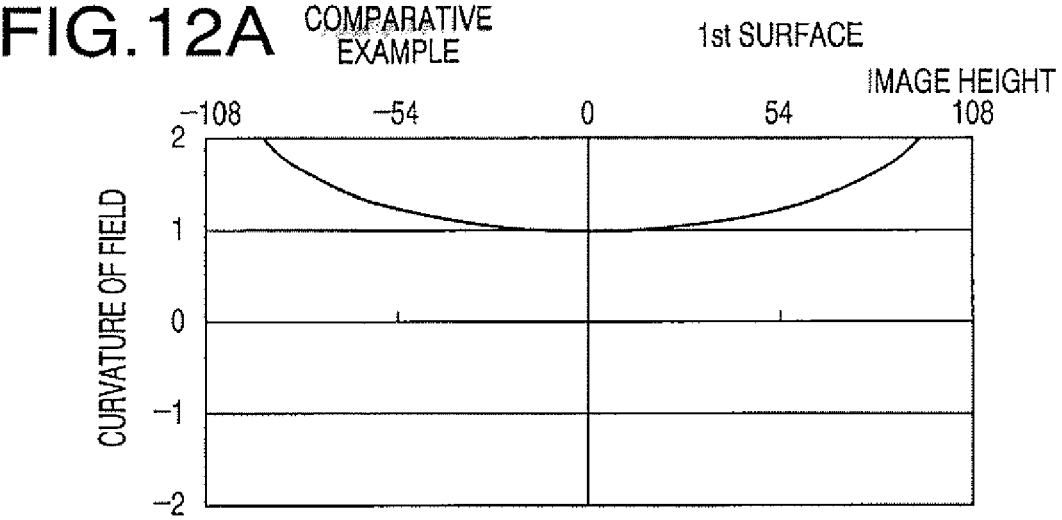
FIG.12A COMPARATIVE EXAMPLE — 1st SURFACE
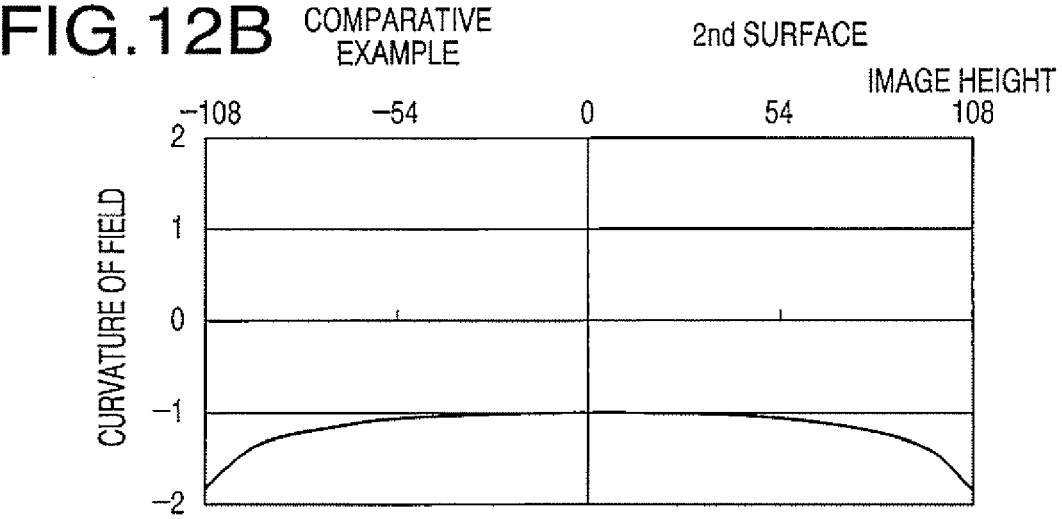
FIG.12B COMPARATIVE EXAMPLE — 2nd SURFACE
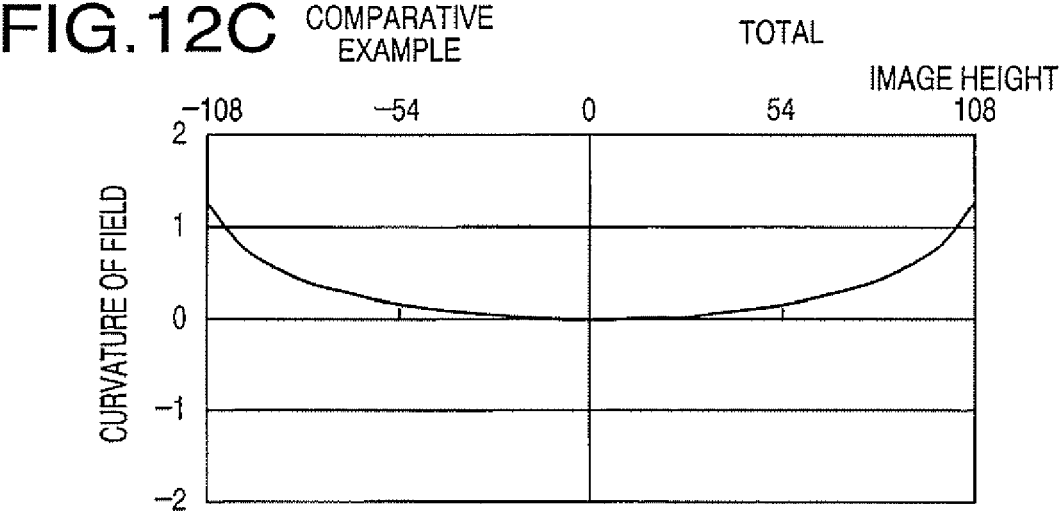
FIG.12C COMPARATIVE EXAMPLE — TOTAL

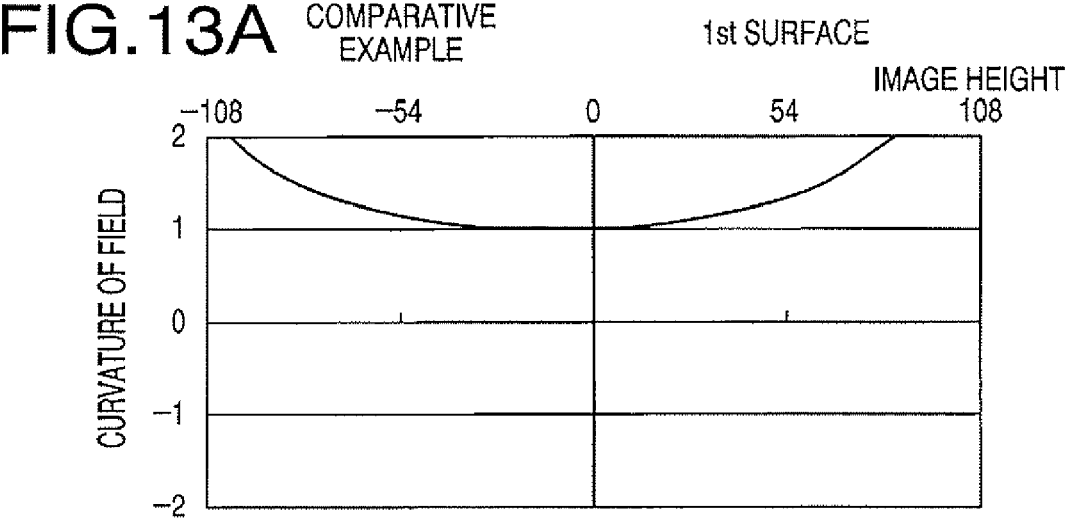
FIG.13A COMPARATIVE EXAMPLE — 1st SURFACE
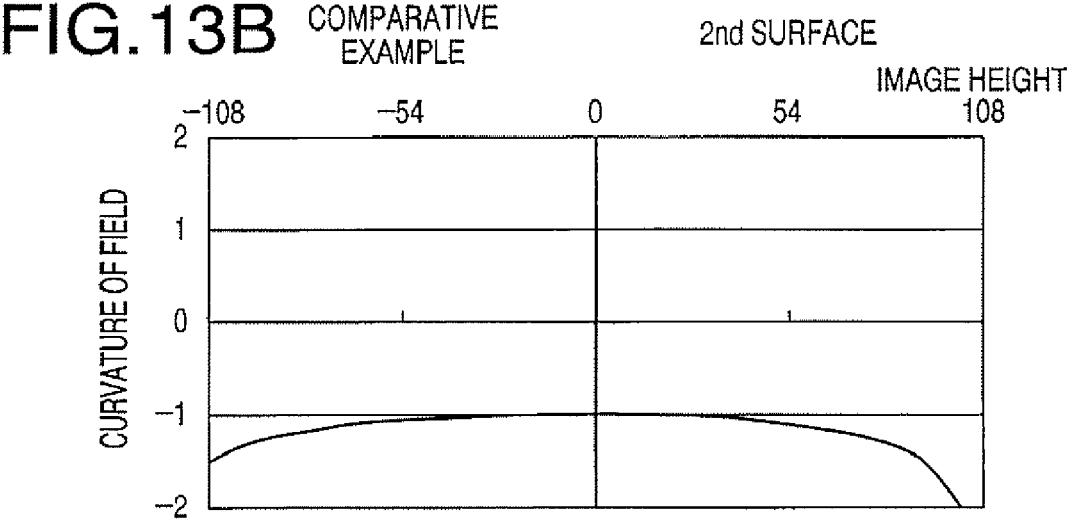
FIG.13B COMPARATIVE EXAMPLE — 2nd SURFACE
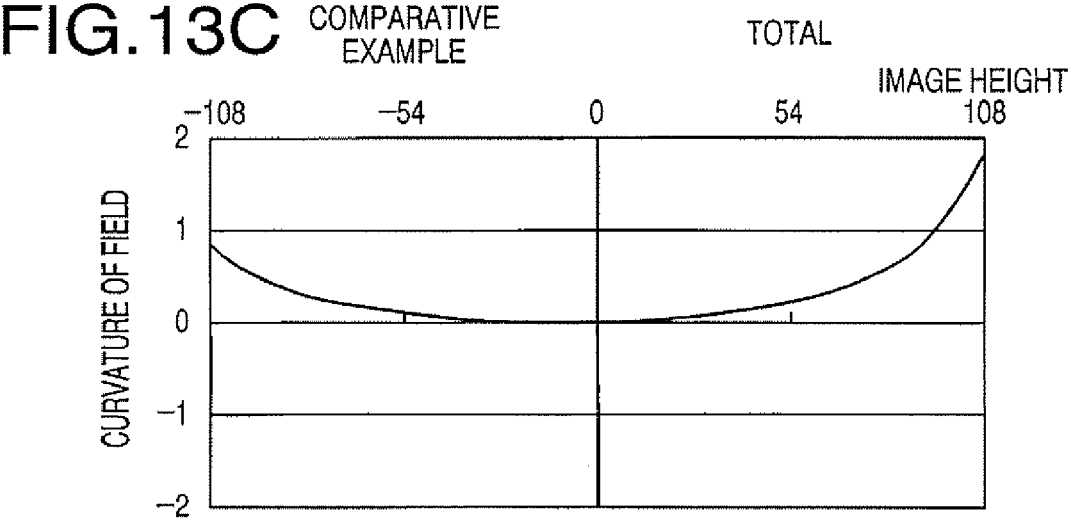
FIG.13C COMPARATIVE EXAMPLE — TOTAL

SCANNING DEVICE

BACKGROUND OF THE INVENTION

The present invention relates to a scanning device such as an LSU (Laser Scanning Unit) mounted on a laser printer, and particularly to a scanning device capable of suppressing curvature of field caused by deformation of a lens.

In general, a scanning device includes a light source, a deflecting unit such as a polygonal mirror, and an image forming optical system such as an fθ lens. In the scanning device, a laser beam emitted by the light source is reflected and deflected by the deflecting unit and is converged onto a scan target surface such as an outer circumferential surface of a photoconductive drum so that a beam spot formed by the image forming optical system scans on the scan target surface in a main scanning direction. By on/off modulating the laser beam, a latent image can be formed on the scan target surface.

The scanning device to be used as an LSU is required to be low cost and compact in size. Therefore, in order to reduce cost and to downsize the scanning device, the scanning device is frequently configured such that the fθ lens is formed of two plastic lenses and the image forming optical system has a wide angle of view relative to its size in a direction of an optical axis. An example of this type of scanning device is disclosed in Japanese Patent Provisional Publication No. HEI 7-146437.

However, the above mentioned fθ lens formed of two plastic lenses has a drawback that if the fθ lens has a relatively wide angle of view, optical performance of the fθ lens tends to be deteriorated by a molding error because, due to the relatively wide angle of view, a first lens located on the polygonal mirror side in the fθ lens has a small radius of curvature and a relatively wide region of the fθ lens is used as an effective area. For example, if a meniscus lens is used in the fθ lens and the meniscus lens has a molding error, the meniscus lens tends to be deformed such that the curvature of each of lens surfaces thereof becomes larger. If the meniscus lens has such a molding error, the curvature of field also increases, and thereby the imaging quality may be deteriorated.

SUMMARY OF THE INVENTION

The present invention is advantageous in that it provides a scanning device capable of suppressing the curvature of field even if a lens has an error in shape.

According to an aspect of the invention, there is provided a scanning device, which is provided with a light source unit the emits a light beam, a collection optical system that converges with light beam emitted by the light source unit principally in an auxiliary scanning direction, a deflector that deflects the light beam converged by the collection optical system, an image forming optical system that converges the light beam deflected by the deflector onto a scan target surface to form a beam spot scanning in a main scanning direction which is perpendicular to the auxiliary scanning direction. In this configuration, the scanning device satisfies a following condition:

$$-1 < S_1 - S_2 < 1 \quad (A)$$

where $$S_1 = \frac{(y_{1\_max} - y'_{1\_max})^2}{(y_{1\_0} - y'_{1\_0})^2} \times \frac{\left(\frac{1}{L_1} + \frac{1}{L\cos\theta}\right)^2}{\left(\frac{1}{L_1} + \frac{1}{L}\right)^2},$$

$$S_2 = \frac{(y_{2\_max} - y'_{2\_max})^2}{(y_{2\_0} - y'_{2\_0})^2} \times \frac{\left(\frac{1}{L_1} + \frac{1}{L\cos\theta}\right)^2}{\left(\frac{1}{L_1} + \frac{1}{L}\right)^2},$$

$y_{1\_max}$ represents a height from an optical axis of the image forming optical system to a position at which an outer edge light ray of the light beam proceeding to a maximum image height enters a first surface of a max-power lens having a maximum power in the main scanning direction of all lenses in the image forming optical system $y'_{1\_max}$ represents a height from the optical axis to a position at which an inner edge light ray of the light beam proceeding to the maximum image height enters the first surface, $y_{1\_0}$ represents a height from the optical axis to a position at which the outer edge light ray of the light beam proceeding to a scanning center enters the first surface, $y'_{1\_0}$ represents a height from the optical axis to a position at which the inner edge light ray of the light beam proceeding to the scanning center enters the first surface, $y_{2\_max}$ represents a height from the optical axis to a position at which the outer edge light ray of the light beam proceeding to the maximum image height enters a second surface of the max-power lens, $y'_{2\_max}$ represents a height from the optical axis to a position at which the inner edge light ray of the light beam proceeding to the maximum image height enters the second surface, $y_{2\_0}$ represents a height from the optical axis to a position at which the outer edge light ray of the light beam proceeding to the scanning center enters the second surface, $y'_{2\_0}$ represents a height from the optical axis to a position at which the inner edge light ray of the light beam proceeding to the scanning center enters the second surface, $\theta$ represents an angle formed between the optical axis and the light beam proceeding to the maximum image height, L represents a distance between the first surface and a position of an image formed in the main scanning direction by an optical system located on the light source unit side of the max-power lens, and $L_1$ represents a distance between the second surface and the scan target surface.

With this configuration, it is possible to sufficiently suppress curvature of field even if a lens in the image forming optical system has an error in shape.

According to an another aspect of the invention, there is provided a scanning device, which is provided with a light source unit that emits a light beam, a collection optical system that converges the light beam emitted by the light source unit principally in an auxiliary scanning direction, a deflector that deflects the light beam converged by the collection optical system, an image forming optical system that converges the light beam deflected by the deflector onto a scan target surface to form a beam spot scanning in a main scanning direction which is perpendicular to the auxiliary scanning direction. In this configuration, the scanning device satisfies a following condition:

$$\frac{(1+\cos\theta)^2}{4} < S_1 < 2 \qquad \text{(B)}$$

$$S_1 = \frac{(y_{1\_max} - y'_{1\_max})^2}{(y_{1\_0} - y'_{1\_0})^2} \times \frac{\left(\frac{1}{L_1} + \frac{1}{L\cos\theta}\right)^2}{\left(\frac{1}{L_1} + \frac{1}{L}\right)^2}.$$

With this configuration, it is possible to sufficiently suppress curvature of field even if a lens in the image forming optical system has an error in shape.

Optionally, the scanning device may satisfy a following condition:

$$S_1 < 2\left(\frac{y_{1\_max}}{2y_{1\_max} - y'_{1\_max}}\right)^2 \qquad \text{(C)}$$

In the above mentioned two aspects of the invention, an optical system between the light source unit and the deflector may include a collimator lens which converts the light beam from the light source unit into a collimated beam, and the collection optical system. In this case, the scanning device may be configured such that if $f_A$ represents a focal length of the collection optical system in the main scanning direction and $L_0$ represents a distance from the collection optical system to the first surface along the optical axis, $L=-(L_0-f_A)$ holds.

Optionally, the max-power lens having the maximum power in the main scanning direction may be configured to be a positive lens satisfying a following condition:

$$1/r_1 > 1/r_2 \qquad \text{(D)}$$

where $r_1$ represents a radius of curvature in a paraxial region of the first surface, and $r_2$ represents a radius of curvature in a paraxial region of the second surface.

Still optionally, the max-power lens may satisfy a following condition:

$$1/r_1 \leq 0 \qquad \text{(E)}.$$

In a particular case, the angle $\theta$ may be larger than or equal to 45°.

BRIEF DESCRIPTION OF THE ACCOMPANYING DRAWINGS

FIGS. 3A, 3B and 3C schematically illustrate curvature of field which is caused by an error in shape of a lens and varies depending on values of a difference ($S_1-S_2$).

FIGS. 3D, 3E and 3F schematically illustrate curvature of filed which varies depending on $S_1$.

Figure 4:
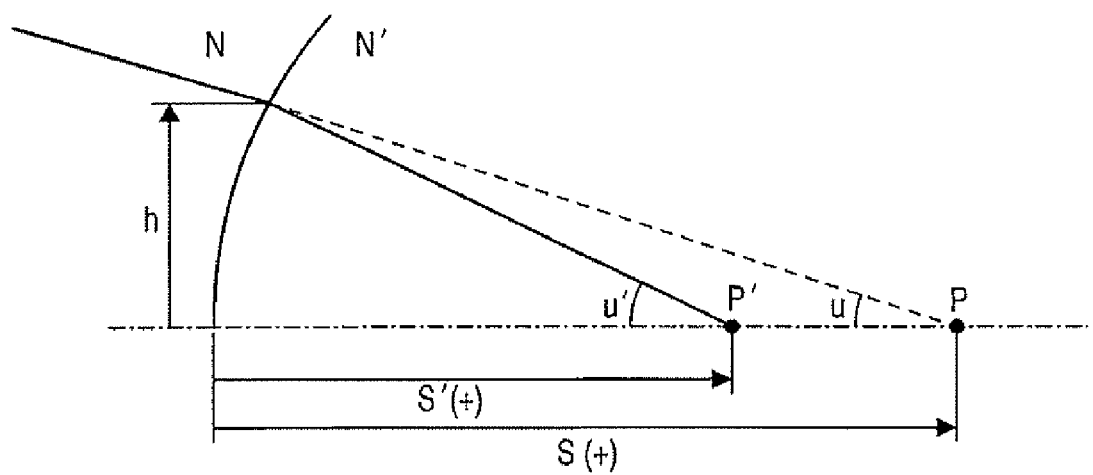

FIG. 4 illustrates a situation where a light ray, intersecting with an optical axis at an angle u, enters a lens surface having a curvature radius r (curvature C) and is refracted by the lens surface.

Figure 5:
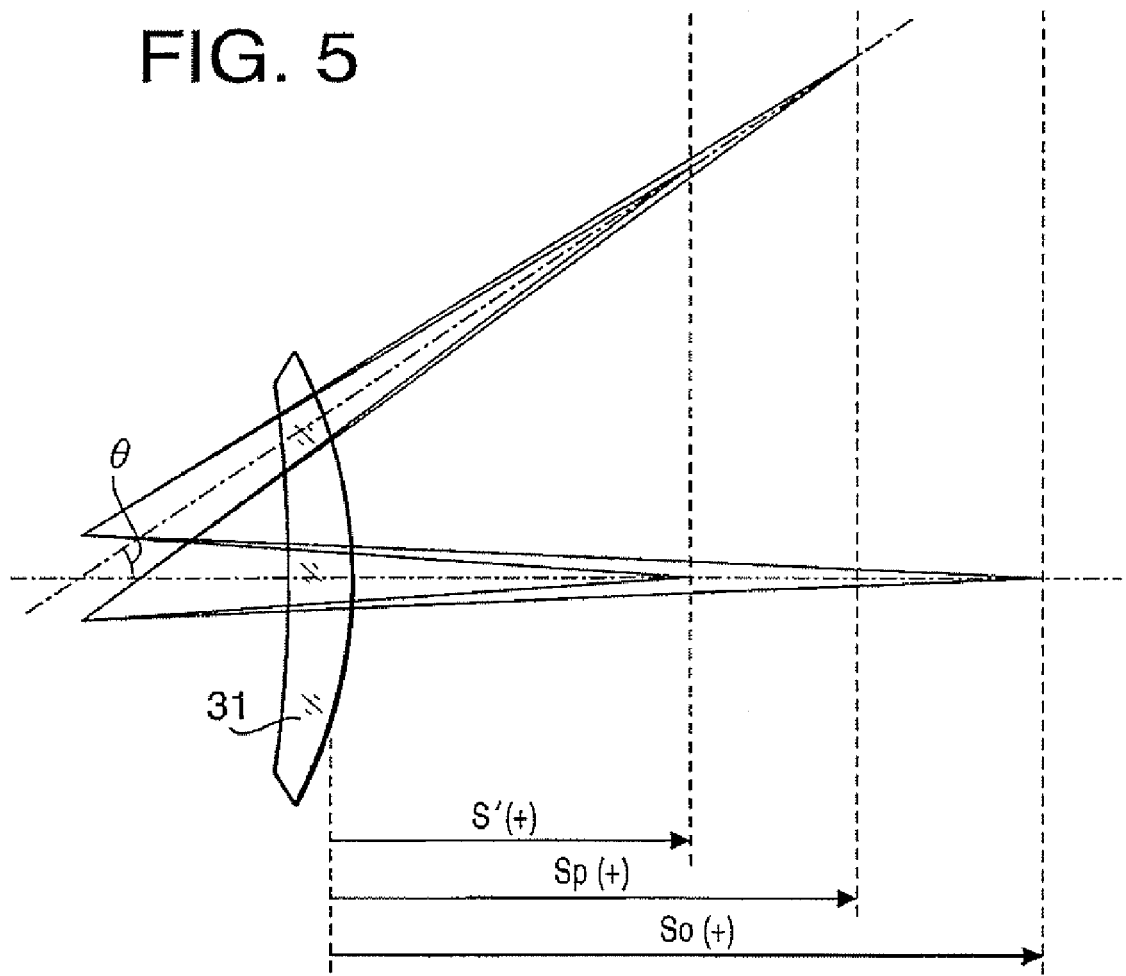

FIG. 5 is an exemplary illustration showing a difference between a light beam entering a first lens along an optical axis and a light beam which enters the first lens and proceeds to a maximum image height while forming an angle $\theta$ with respect to the optical axis.

FIGS. 6A, 6B and 6C are graphs illustrating curvature of field caused in a scanning device according to a first example when the shape of the first lens has an error and no decentering of the first lens has occurred.

FIGS. 7A, 7B and 7C are graphs illustrating curvature of field caused in the scanning device according to the first example when the shape of the first lens has an error and the decentering of the first lens corresponding to the size of one beam has also occurred.

Figure 8:
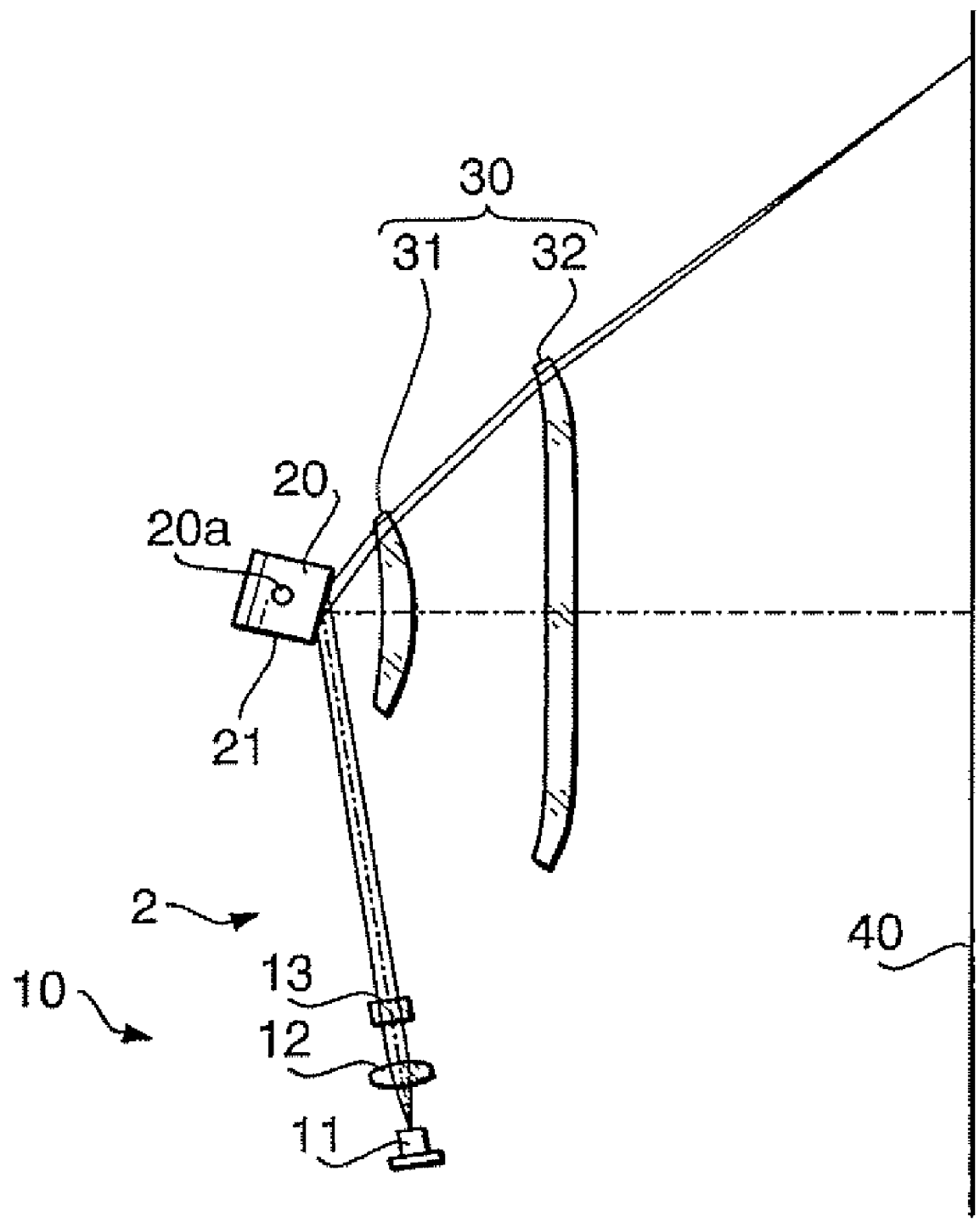

FIG. 8 is a plan view of a scanning device according to a second example.

FIGS. 9A, 9B and 9C are graphs illustrating curvature of field caused in a scanning device according to a second example when the shape of the first lens has an error and no decentering of the first lens has occurred.

FIGS. 10A, 10B and 10C are graphs illustrating curvature of field caused in the scanning device according to the second example when the shape of the first lens has an error and the decentering of the first lens corresponding to the size of one beam has also occurred.

Figure 11:
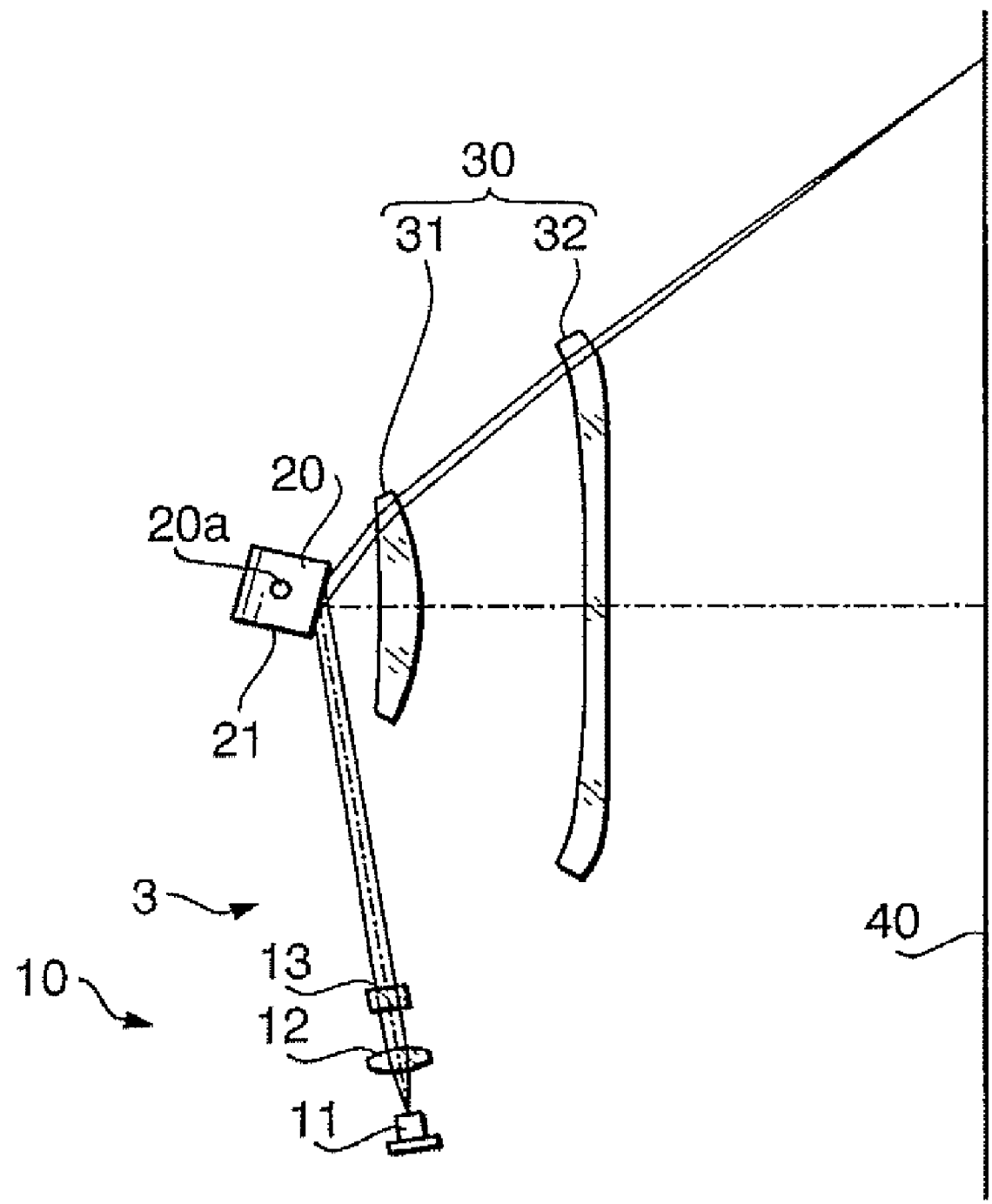

FIG. 11 is a plan view of a scanning device according to a comparative example designed to evaluate a configuration of the scanning device according to the embodiment.

FIGS. 12A, 12B and 12C are graphs illustrating curvature of field caused in the scanning device according to the comparative example when the shape of the first lens has an error and no decentering of the first lens has occurred.

FIGS. 13A, 13B and 13C are graphs illustrating curvature of field caused in the scanning device according to the comparative example when the shape of the first lens has an error and the decentering of the first lens corresponding to the size of one beam has also occurred.

DETAILED DESCRIPTION OF THE EMBODIMENTS

Hereinafter, an embodiment according to the invention is described with reference to the accompanying drawings.

In this specification, a direction in which a beam spot moves (i.e., a direction in which a scanning line extends) will be referred to as a main scanning direction. Further, a direction in which a surface to be scanned moves with respect to the scanning line (e.g., a rotation direction of a photoconductive drum) will be referred to as an auxiliary scanning direction. In the following description, the shape of optical elements, directions of powers of the optical elements and the like are described with reference to the main and auxiliary scanning directions on the surface to be scanned. That is, if an optical element is described to have a refractive power in the main scanning direction, the power affects the beam in the main scanning direction on the surface to be scanned regardless of the orientation of the element.

Figure 1:
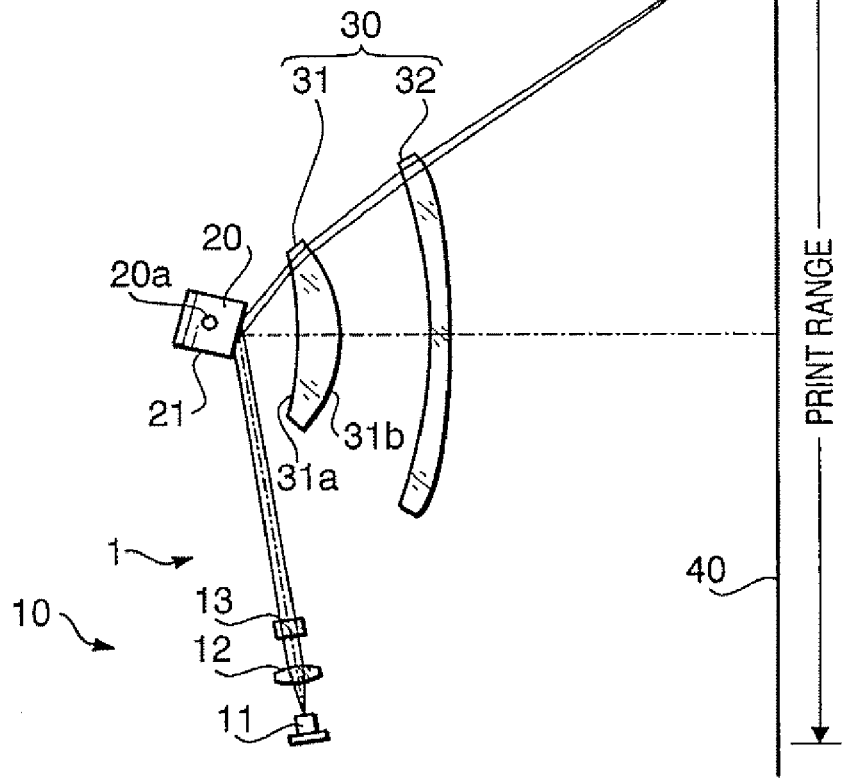
FIG. 1 is a plan view of a scanning device according to an embodiment of the invention.

FIG. 1 is a plan view of a scanning device 1 according to an embodiment of the invention. As shown in FIG. 1, the scanning device 1 includes a light source unit 10, a polygonal mirror 20 functioning as a deflector, and an fθ lens 30 functioning as an image forming optical system. A laser beam emerging from the light source unit 10 is deflected by the polygonal mirror 20, and the deflected laser beam is converged by the fθ lens 30 to form a beam spot scanning on a scan target surface 40 such as a photoconductive drum in the main scanning direction. By on/off modulating the laser beam, a latent image can be formed on the scan target surface 40.

The light source unit 10 includes a semiconductor laser 11, a collimator lens 12 serving to convert a diverging laser beam emitted by the semiconductor laser 11 into a collimated beam, and an anamorphic lens (i.e., an anamorphic element) 13 having a positive power mainly in the auxiliary scanning direction which is perpendicular to the main scanning direction. The laser beam which has been on/off modulated and been emerged from the light source unit 10 impinges on the polygonal mirror 20 from the outside of a scanning range of the polygonal mirror 20. As the anamorphic lens 13 (i.e., as a collection optical system), a cylindrical lens having a positive power only in the auxiliary scanning direction or a toric lens having a relatively large positive power in the auxiliary scanning direction and having a relatively small positive power in the main scanning direction may be used.

The polygonal mirror 20 has four reflection surfaces 21, and is provided in the scanning unit 1 to be rotatable in the clockwise direction about a rotation axis 20a which is perpendicular to the main scanning direction. The fθ lens 30 includes a first lens 31 located in the vicinity of the polygonal mirror 20, and a second lens 32 located on the scat target surface side. Each of the first and second lenses 31 and 32 is a plastic lens. A lens surface of the first lens 31 on the polygonal mirror side is referred to as a first surface 31a, and a lens surface of the first lens 31 on the scan target surface side is referred to as a second surface 31b. The first lens 31 is defined as a lens having the maximum power in the main scanning direction of all of lenses in the image forming optical system.

The laser beam collimated by the collimator lens 12 is converged by the anamorphic lens 13 to form a line-like image in the vicinity of the polygonal mirror 20.

The laser beam deflected by the polygonal mirror 20 is incident on the fθ lens 30 as a collimated beam in the main scanning direction, as indicated in a solid line in FIG. 1, and as a diverging beam in the auxiliary scanning direction. The laser beam passed through the fθ lens 30 forms the beam spot on the scan target surface. With rotation of the polygonal mirror 20, the beam spot moves on the scan target surface 40 in the main scanning direction. By controlling the semiconductor laser 11 to modulate the laser beam, a scanned line is formed on the scan target surface 40.

When $S_1$ and $S_2$ are defined by the following equations (1) and (2), the scanning device 1 is configured to satisfy the following condition (A).

$$S_1 = \frac{(y_{1\_max} - y'_{1\_max})^2}{(y_{1\_0} - y'_{1\_0})^2} \times \frac{\left(\frac{1}{L_1} + \frac{1}{L\cos\theta}\right)^2}{\left(\frac{1}{L_1} + \frac{1}{L}\right)^2} \quad (1)$$

$$S_2 = \frac{(y_{2\_max} - y'_{2\_max})^2}{(y_{2\_0} - y'_{2\_0})^2} \times \frac{\left(\frac{1}{L_1} + \frac{1}{L\cos\theta}\right)^2}{\left(\frac{1}{L_1} + \frac{1}{L}\right)^2} \quad (2)$$

In the equations (1) and (2), $y_{1\_max}$ represents a height from an optical axis of the fθ lens 30 to a position at which an outer edge light ray of the laser beam proceeding to the maximum image height enters the first surface 31a, $y'_{1\_max}$ represents a height from the optical axis to a position at which an inner edge light ray of the laser beam proceeding to the maximum image height enters the first surface 31a, $y_{1\_0}$ represents a height from the optical axis to a position at which an outer edge light ray of the laser beam proceeding to the scanning center enters the first surface 31a, $y'_{1\_0}$ represents a height from the optical axis to a position at which an inner edge light ray of the laser beam proceeding to the scanning center enters the first surface 31a, $y_{2\_max}$ represents a height from the optical axis to a position at which an outer edge light ray of the laser beam proceeding to the maximum image height enters the second surface 31b, $y'_{2\_max}$ represents a height from the optical axis to a position at which an inner edge light ray of the laser beam proceeding to the maximum image height enters the second surface 31b, $y_{2\_0}$ represents a height from the optical axis to a position at which an outer edge light ray of the laser beam proceeding to the scanning center enters the second surface 31b, $y'_{2\_0}$ represents a height from the optical axis to a position at which an inner edge light ray of the laser beam proceeding to the scanning center enters the second surface 31b, θ represents an angle formed between the optical axis and the laser beam proceeding to the maximum image height, L represents a distance between the first surface and a position of an image formed in the main scanning direction by an optical system located on the light source side with respect to the first lens 31, and $L_1$ represents a distance between the second surface 31b and the scan target surface 40.

$S_1$ represents a predicted value of a ratio of a focal shift amount at the scanning center to a focal shift amount at the maximum image height when the shape of the first surface 31a of the first lens 31 has an error. $S_2$ represents a predicted value of a ratio of a focal shift amount at the scanning center to a focal shift amount at the maximum image height when the shape of the second surface 31b of the first lens 31 has an error. The maximum image height varies depending on performance specifications of the imaging device 1. That is, the maximum image height is equal to a half width of a sheet of paper to be scanned. For example, the maximum image height is approximately 108 mm for the scanning of an A4 size sheet, and is approximately 150 mm for the scanning of a A3 size sheet. If maximum image heights respectively defined for both edges of a sheet are different from each other, one of the maximum image heights having a larger absolute value is used in the above equations.

Figure 2:
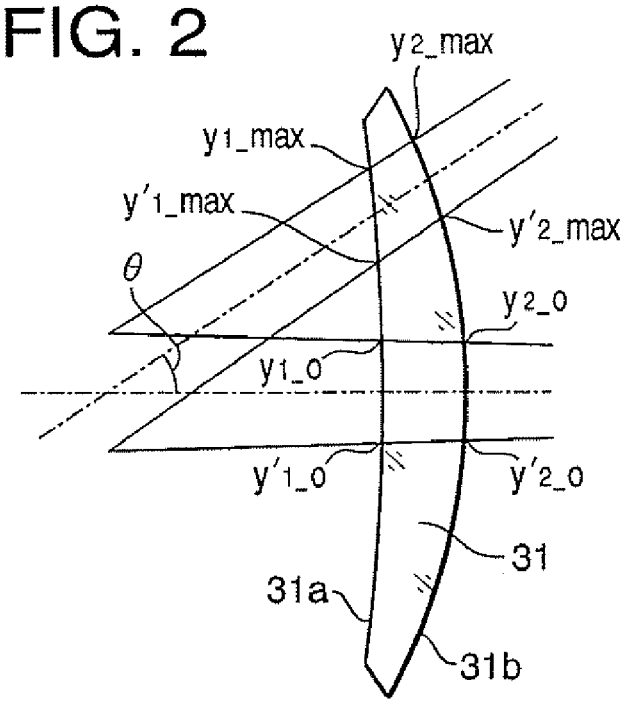
FIG. 2 illustrates heights of light rays of both edges defining a beam diameter in a main scanning direction.

FIG. 2 illustrates heights of light rays defining the diameter of the laser beam at both edges of the beam in the main scanning direction. As shown in FIG. 2, the light ray having a higher position from the optical axis in the main scanning direction is defined as the outer edge light ray, and the light ray having a lower position from the optical axis in the main scanning direction is defined as the inner edge light ray. In other words, on the side where heights from the optical axis have positive values, a light ray defining an outer edge of the beam is the outer edge light ray and a light ray defining an inner edge of the beam is defined as the inner edge light ray. On the side where heights from the optical axis have negative values, a light ray defining an inner edge of the beam is the outer edge light ray and a light ray defining an outer edge of the beam is defined as the inner edge light ray.

It is understood that the subtraction of heights of the light rays in each of the equations (1) and (2) represents the beam diameter. In practice, the beam diameter is determined by an aperture stop located between the light source unit 10 and the polygonal mirror 20.

By satisfying the condition (A), it is possible to cancel curvature of field caused by an error in the shape of the first surface 31a with curvature of field caused by an error in the shape of the second surface 31b, and thereby to suppress a focal shift amount on the off-axial light caused by an error in the shape of the first lens 31 to the extent to which the focal shift amount on the paraxial light caused by an error in the shape of the first lens 31.

In this embodiment, it is predicted that a value obtained by multiplying a square of a ratio between a diameter of the laser beam proceeding to the maximum image height and a diameter of the laser beam at the center of the first lens 31 (i.e., a lens having a maximum power of all of lenses in the image forming optical system) by a square of the power corresponds to a ratio between the focal shift amount at the off-axis position and the focal shift amount at the optical axis, and the scanning device 1 is configured to suppress the predicted value to a certain level. By suppressing the predicted value within the range defined by the condition (A), it is possible to suppress the focal shift amount caused by an error in shape of a lens at the off-axis position to a level corresponding to the focal shift amount caused by an error in shape of a lens at the optical axis.

FIGS. 3A, 3B and 3C schematically illustrate the curvature of field which is caused by an error in the shape of the first lens 31 and varies depending on the difference $(S_1-S_2)$ in the condition (A). As shown in FIGS. 3A, 3B and 3C, if the difference $(S_1-S_2)$ is the lower limit of $-1$, the curvature of field is caused in a form where the focus shifts toward the front in the peripheral part of the first lens 31. If the difference $(S_1-S_2)$ is 0, no focal shift is caused in the entire part of the first lens 31. If the difference $(S_1-S_2)$ is 1, the curvature of field is caused in a form where the focus shifts toward the rear in the peripheral part of the first lens 31.

Hereafter, derivation of each of $S_1$ and $S_2$ is described. FIG. 4 illustrates a situation where a light ray enters a lens surface having a curvature radius r (curvature C) and is refracted by the lens surface. An extension of the light beam before entering the lens surface intersects with an optical axis at an angle u (see the dashed line). If refractive indexes of medium on the front side of the lens surface and medium on the rear side of the lens surface are respectively represented by N and N', a distance between the lens surface and a point P at which a right ray not refracted by the lens surface intersects with the optical axis is represented by S, and a distance between the lens surface and a point P' at which the refracted light ray intersects with the optical axis is represented by S', the following equation (3) holds.

$$\frac{N'}{S'} = \frac{N}{S} + \frac{N'-N}{r} = \frac{N}{S} + (N'-N)C \tag{3}$$

If a shifting amount of the point P' caused when an error of the shape of the lens surface (i.e., an error $\Delta C$ in curvature) occurs is represented by $\Delta S'$, $\Delta S'$ is defined by the following equation (4).

$$\Delta S' = \left(\frac{N}{N'} - 1\right) S^2 \Delta C \tag{4}$$

If a height from the optical axis to a point at which the light ray enters the lens surface is represented by h, and an angle at which the refracted light ray intersects with the optical axis is represented by u', the equation (4) can be replaced with the following equation (5) because in this case $S=h/(\tan u')$ holds.

$$\Delta S' = \left(\frac{N}{N'} - 1\right)\left(\frac{h}{\tan u'}\right)^2 \Delta C \tag{5}$$

If m represents magnification of an optical system formed by lens surfaces located on the scan target surface side with respect to the lens surface shown in FIG. 4, the focal shift $\Delta S'_D$ caused by the error $\Delta C$ on the scan target surface can be defined by the following equation (6).

$$\begin{aligned}\Delta S'_D &= m^2 \Delta S' \\ &= m^2 \left(\frac{N}{N'} - 1\right)\left(\frac{h}{\tan u'}\right)^2 \Delta C \\ &= \left(\frac{N}{N'} - 1\right)\left(h / \left(\frac{\tan u'}{m}\right)\right)^2 \Delta C\end{aligned} \tag{6}$$

If $u'_D$ represents an angle formed by the above mentioned light ray with respect to the optical axis on the scan target surface side, the following equation (7) holds. The angle of the light ray can be converted into F-number $F_{NO}$ as indicated in the following equation (8).

$$\tan u'_D = \frac{\tan u'}{m} \tag{7}$$

$$2F_{NO} = \frac{1}{\tan u'_D} \tag{8}$$

By assigning the equations (7) and (8) to the equation (6), the following equation (9) is obtained. Further, assuming that the F-number and the refractive index are constant, the following equation (10) is obtained using a scanning coefficient K.

$$\Delta S'_D = \left(\frac{N}{N'} - 1\right)(h \times 2F_{NO})^2 \Delta C \tag{9}$$

$$\Delta S'_D = K(2h)^2 \Delta C \tag{10}$$

Hereafter, the amount of the error $\Delta C$ which may vary depending on the height at which the light ray enters the lens surface is described. In general, when a lens deforms, an error $\Delta r$ in a radius of curvature occurs over the entire region of a lens surface. Because the curvature C is 1/r, the error $\Delta C$ can be represented by the following equation (11).

$$\begin{aligned}\Delta C &= \frac{1}{r^2} \Delta r \\ &= \left(\frac{1-h}{f}\right)^2 \Delta r\end{aligned} \tag{11}$$

Consider a difference between a beam entering a lens along the optical axis and a beam which enters the lens at an angle θ with respect to the optical axis and proceeds to the maximum image height (see FIG. 5). If $\Delta C_0$ and $f_0$ respectively represent change of curvature and change of a focal length defined at the lens center of the lens surface, and $\Delta C_P$ and $f_P$ respectively represent change of curvature and change of a focal length defined at the peripheral part of the lens surface, the following equations (12), (13) and (14) hold.

$$\frac{\Delta C_P}{\Delta C_0} = \frac{f_0^2}{f_P^2} \quad (12)$$

$$\frac{1}{f_0} = \frac{1}{S'} - \frac{1}{S_0} \quad (13)$$

$$\frac{1}{f_P} = \frac{1}{S'} - \frac{1}{S_P} = \frac{1}{S'} - \frac{1}{S_0 \cos\theta} \quad (14)$$

Assuming that S' represents the distance $L_1$ between the first lens 31 and the scan target surface 40 and $S_0$ represents the distance L between the first surface 31a of the first lens 31 and a position of an image formed in the main scanning direction by an optical axis located on the light source side with respect to the first lens 31, the equations (13) and (14) are converted to the following equations (15) and (16), respectively.

$$\frac{1}{f_0} = \frac{1}{L_1} + \frac{1}{L} \quad (15)$$

$$\frac{1}{f_P} = \frac{1}{L_1} + \frac{1}{L\cos\theta} \quad (16)$$

In summary, from the equation (10), the ratio $S_1$ between the focal shift $\Delta S'_{D0}$ defined on the optical axis in the vicinity of the scan target surface and the focal shift $\Delta S'_{DP}$ defined in the peripheral region is defined as the following equation (17) where $h_0$ and $\Delta C_0$ respectively represent the height at which a beam along the optical axis enters the lens surface and change of curvature for the beam along the optical axis, and $h_P$ and $\Delta C_P$ respectively represent the height at which a beam proceeding to the maximum image height enters the lens surface and change of curvature for the beam proceeding to the maximum image height. By applying the equation (12) to the equation (17) and applying the equations (15) and (16) to the equation (18), the following equation (19) is obtained.

$$S_1 = \frac{\Delta S'_{DP}}{\Delta S'_{D0}} = \frac{K(2h_P)^2 \Delta C_P}{K(2h_0)^2 \Delta C_0} \quad (17)$$

$$= \frac{(2h_P)^2}{(2h_0)^2} \times \frac{f_0^2}{f_P^2} \quad (18)$$

$$= \frac{(2h_P)^2}{(2h_0)^2} \times \frac{\left(\frac{1}{L_1} + \frac{1}{L\cos\theta}\right)^2}{\left(\frac{1}{L_1} + \frac{1}{L}\right)^2} \quad (19)$$

Since $2h_P = y_{1\_max} - y'_{1\_max}$ and $2h_0 = y_{1\_0} - y'_{1\_0}$ hold in the equation (1), $S_1$ can be defined as indicated in the above mentioned equation (1). Similarly, the focal shift ratio $S_2$ can also be obtained.

The scanning device 1 may be configured such that the predicted value $S_1$ satisfies the following condition (B). By satisfying the condition (B), the curvature of field caused by an error in the lens shape can be sufficiently reduced only by the effect of the first surface 31a. Therefore, even if the curvature of field due to an error in the shape of the second surface 31b is not caused, the curvature of field regarding the entire lens can be sufficiently reduced.

In other words, by providing the change of the beam diameter so that the curvature of field can be reduced only by the effect of the first surface 31a, it is possible to suppress the curvature of field to a certain amount only by the effect of the first surface 31a.

FIGS. 3D, 3E and 3F schematically illustrate the curvature of filed which varies depending on $S_1$ in the condition (B). As shown in FIGS. 3D, 3E and 3F, the focus shifts to the rear side in every value of $S_1$. Specifically, when $S_1$ is approximately 0, the focal shift in the peripheral part of the first lens 31 becomes smaller than that of the central part. When $S_1$ is equal to 1, the focus shifts to the rear side by a constant amount over the entire region on the first lens 31. When $S_1$ is equal to the upper limit of 2, the focal shift toward the rear side becomes larger in the peripheral part than that in the central part. The scanning device 1 may be configured such that the predicted value $S_1$ further satisfies the following condition (C). By satisfying the condition (C), it is possible to prevent the focal shift from becoming larger only in the peripheral part. In other words, by assuming that the curvature of field is a secondary function and securing a margin corresponding to a diameter of one light beam on the outside of the scanning range to suppress the curvature of field within the range including the margin, it is possible to prevent the focal shift from becoming larger only in the peripheral region of the first lens 31 even if the first lens 31 is decentered in the main scanning direction.

$$\frac{(1 + \cos\theta)^2}{4} < S_1 < 2 \quad (B)$$

$$S_1 < 2\left(\frac{y_{1\_max}}{2y_{1\_max} - y'_{1\_max}}\right)^2 \quad (C)$$

Hereafter, derivation of the lower limit of the condition (B) is described. The lower limit of the condition (B) corresponds to a situation where the first surface 31a of the first lens 31 is configured not to generate negative distortion (i.e., the first surface 31a is a spherical surface having a deflection point at its center), the first lens 31 has no power in the main scanning direction, and only the anamorphic lens 13 has a power in the main scanning direction to be provided by the scanning device 1. In this case, the first term in the right side of the condition (1) is $\cos^2\theta$ as shown in the equation (20).

If power of the anamorphic lens 13 in the main scanning direction takes the maximum value, an image plane of the anamorphic lens 13 coincides with the scan target surface, and $L=L_1$ holds. In this case, the second term of the right side of the condition (A) can be represented as shown in the following equation (21). Accordingly, $S_1$ can be represented as $(1+\cos\theta)^2/4$ using the equations (20) and (21). The lower limit of the condition (B) is thus obtained.

$$\frac{(y_{1\_max} - y'_{1\_max})^2}{(y_{1\_0} - y'_{1\_0})^2} = \cos^2\theta \qquad (20)$$

$$\frac{\left(\frac{1}{L_1} + \frac{1}{L\cos\theta}\right)^2}{\left(\frac{1}{L_1} + \frac{1}{L}\right)^2} = \frac{\left(\frac{1}{\cos\theta}+1\right)^2}{(1+1)^2} = \left(\frac{1+\cos\theta}{2\cos\theta}\right)^2 \qquad (21)$$

Hereafter, the upper limit of the condition (C) is described. If $y_{1H}$ represents a height from the optical axis to a position at which an outer edge light ray of the beam proceeding to the maximum image height in a state where the first lens 31 is decentered in the main scanning direction enters the first surface of the first lens 31, and $S_{1H}$ represents the value of $S_1$ after the decentering of the first lens 31, $S_{1H}$ is represented by the following equation (22) assuming that the focal shift occurring near a position at which the beam enters the first lens 31 changes in a form of a secondary function. Since the value of $S_{1H}$ may be smaller than 2, the condition (C) is derived.

$$S_{1H} = S_1 \times \frac{y_{1H}^2}{y_{1\_max}^2} \qquad (22)$$

$$S_1 \times \frac{y_{1H}^2}{y_{1\_max}^2} < 2 \qquad (C)$$

$$S_1 \times \frac{(y_{1\_max} + (y_{1\_max} - y'_{1\_max}))^2}{y_{1\_max}^2} < 2$$

$$S_1 < 2\left(\frac{y_{1\_max}}{2y_{1\_max} - y'_{1\_max}}\right)^2$$

The focal length $f_A$ of the anamorphic lens 13 in the main scanning direction may be a finite positive value. In this case, the distance L is represented by $L=-(L_0-f_A)$ where $L_0$ represents a distance from the first surface 31a to the anamorphic lens 13 along the optical axis. By thus configuring the anamorphic lens 13 to have a finite positive focal length in the main scanning direction and causing a converging beam to enter the anamorphic lens 13, it is possible to cause an object surface to approach the anamorphic lens 13 when the scanning device 1 is viewed as an developed view. Therefore, it is possible to decrease off-axis power of the image forming optical system, and to decrease the focal shift caused by an error in the lens shape at off-axis positions.

The first lens 31 may be configured to be a positive lens satisfying the following conditions (D) and (E). That is, the first lens 31 is a meniscus lens configured such that the first surface 31a is a concave surface and the second surface 31b is a convex surface.

$$1r_1 > 1/r_2 \qquad (D)$$

$$1/r_1 \leq 0 \qquad (E)$$

In the conditions (D) and (E), $r_1$ represents a radius of curvature in a paraxial region of the first surface 31a, and $r_2$ represents a radius of curvature in a paraxial region of the second surface 31b.

By thus defining the curvature of the first surface 31a, it is possible to change the beam diameter by a difference between a sag amount of a position at which the outer edge light ray passes through the first surface and a sag amount of a position at which the inner edge light ray passes through the first surface. If the above mentioned configuration is applied to a scanning device having an angle of view $\theta$ larger than or equal to 45°, the difference between the sag amount of the position at which the outer edge light ray passes through the lens surface and the sag amount of the position at which the inner edge light ray passes through the lens surface becomes larger. Such a configuration is advantageous in adjusting the beam diameter.

Hereafter, two concrete examples of the scanning device 1 according to the embodiment (i.e., scanning devices satisfying the above mentioned conditions) are described. A comparative example not satisfying the above mentioned conditions is also described. In the following examples, the first surface 31a of the first lens 31 is a concave spherical surface, the second surface 31b is a convex rotationally-symmetrical aspherical surface, a surface of the second lens 32 on the polygonal mirror side is a concave rotationally-symmetrical aspherical surface, a surface of the second lens 32 on the scan target surface side is an anamorphic aspherical surface.

A configuration of a rotationally-symmetrical aspherical surface is expressed by the following equation:

$$X(h) = \frac{h^2}{r\left(1 + \sqrt{1-(1+\chi)h^2/r^2}\right)} + A_4 h^4 + A_6 h^6$$

where "X(h)" denotes a SAG amount which is a distance between a point on the aspherical surface at a height of h from the optical axis and a plane tangential to the aspherical surface at the optical axis, "r" denotes a radius of curvature of the aspherical surface on the optical axis, "$\chi$" denotes a conical coefficient, and "$A_4$" and "$A_6$" denote aspherical coefficients of fourth and sixth orders.

An anamorphic aspherical surface is an aspherical surface configured such that the aspherical surface does not have a rotational axis, and a radius of curvature in the auxiliary scanning direction at a position apart from the optical axis is defined separately from a cross section in the main scanning direction. An anamorphic aspherical surface is defined by the following equations:

$$X(y) = \frac{y^2}{ry_0\left(1+\sqrt{1-\frac{(x+1)y^2}{ry_0^2}}\right)} + \sum_{i=4}^{8} AM_i \cdot y^i$$

$$\frac{1}{rz(y)} = \frac{1}{rz_0} + \sum_{i=1}^{8} AS_i \cdot y^i$$

where X(y) presents a cross section of the surface in the main scanning direction, and rz(y) represents a radius of curvature in the auxiliary scanning direction, $ry_0$ represents a radius of curvature in the main scanning direction at the optical axis, $\chi$ represents a conical coefficient, $AM_n$ is an aspherical coefficient of $n^{th}$ order for the main scanning direction, $rz_0$ represents a radius of curvature of the surface in the auxiliary scanning direction at the optical axis, and $AS_n$ is an aspherical coefficient of $n^{th}$ order for determining the curvature in the auxiliary scanning direction.

FIRST EXAMPLE

The scanning device according to a first example has the configuration shown in FIG. 1. Table 1 shows a numerical configuration of the scanning device 1 according to the first example.

TABLE 1

Radius of Circumcircle of Polygonal Mirror = 20 mm
Number of Surfaces of Polygonal Mirror = 4 surfaces
Angle of Incidence = 80°, Maximum Image Height Y = 108 mm
Scanning Coefficient = 112.0 mm, Maximum Deflection Angle Y/K = 1.04 radian

| Surface No. | Ry | Rz | d | n |
|---|---|---|---|---|
| #1 | ∞ | 33.20 | 4.00 | 1.511 |
| #2 | ∞ | — | 62.36 | |
| #3 | ∞ | — | 15.00 | |
| #4 | −184.57 | — | 10.00 | 1.486 |
| #5 | −35.37 | — | 22.33 | |
| #6 | −153.84 | — | 5.00 | 1.486 |
| #7 | ∞ | −14.79 | 82.20 | |
| #8 | ∞ | — | — | |

In Table 1, the character "No." indicates surface numbers that are assigned to optical surfaces in the scanning device 1 starting from a front surface (a beam incident surface) of the anamorphic lens 13. The surface Nos. #1 and #2 denote the front surface and a rear surface (a beam emerging surface) of the anamorphic lens 13, respectively. The surfaces Nos. #3 denotes the reflective surface 21 of the polygonal mirror 20. The surface Nos. #4 and #5 denote the front and rear surfaces of the first lens 31, respectively. The surface Nos. #6 and #7 denote the front and rear surfaces of the second lens 32, respectively. The surface No. #8 denotes the scan target surface 40.

In Table 1 (and in the following similar tables), the "ry" denotes a radius of curvature [mm] of each optical surface in the main scanning direction, "rz" denotes a radius of curvature [mm] of each optical surface in the auxiliary scanning direction, "d" denotes a distance [mm] between an optical surface and a next optical surface along the optical axis, and "nλ" denotes a refractive index of each lens at a design wavelength.

Table 2 shows conical coefficients and aspherical coefficients defining the rotationally-symmetrical aspherical surfaces (#4, #5 and #6). Table 3 shows conical coefficients and aspherical coefficients defining the anamorphic aspherical surface (#7). In Tables 2 and 3 (and in the following similar Tables), a notation symbol E indicates that 10 is used as a radix and a right side value of E is used as an exponent. For example, −2.709E-6 means $-2.709 \times 10^{-06}$.

TABLE 2

| | Surface #4 | Surface #5 | Surface #6 |
|---|---|---|---|
| κ | −2.709E−06 | 5.147E−06 | 3.585E−07 |
| A4 | 1.842E−09 | −4.033E−09 | −2.623E−10 |
| A6 | −8.794E−13 | 8.840E−13 | 0.000E+00 |
| A8 | −2.177E−15 | 0.000E+00 | 0.000E+00 |
| A10 | 1.870E−18 | 0.000E+00 | 0.000E+00 |

TABLE 3

| i | AM | AS |
|---|---|---|
| 1 | 0.000E+00 | 2.566E−05 |
| 2 | 0.000E+00 | 1.901E−05 |
| 3 | 0.000E+00 | 0.000E+00 |
| 4 | −2.694E−06 | −1.658E−08 |
| 5 | 0.000E+00 | 0.000E+00 |
| 6 | 1.407E−09 | 7.028E−12 |
| 7 | 0.000E+00 | 0.000E+00 |
| 8 | −7.372E−13 | −1.592E−15 |
| 9 | 0.000E+00 | 0.000E+00 |
| 10 | 2.121E−16 | 0.000E+00 |
| 11 | 0.000E+00 | 0.000E+00 |
| 12 | −2.951E−20 | 0.000E+00 |

Table 4 shows values defining the above mentioned conditions.

TABLE 4

| $f_A$ | ∞ | | |
|---|---|---|---|
| $f_1$ | 109.53 | | |
| L | 77.36 | | |
| $y_{1\_0}$ | 0.997 | $y_{1\_max}$ | 20.816 |
| $y'_{1\_0}$ | −0.763 | $y'_{1\_max}$ | 18.336 |
| $y_{2\_0}$ | 1.014 | $y_{2\_max}$ | 23.646 |
| $y'_{2\_0}$ | −0.777 | $y'_{2\_max}$ | 21.787 |

From the values shown in Table 4, $S_1=1.99$ and $S_2=1.08$ hold. Therefore, $(S_1-S_2)$ of the condition (A) is 0.91, the left side term (the lower limit) of the condition (B) is 0.56, and the right side term (the upper limit) of the condition (C) is 1.80. The scanning device 1 according to the first example satisfies the conditions (A), (B), (D) and (E) excepting the condition (C).

FIGS. 6A, 6B and 6C are graphs illustrating curvature of field caused in the scanning device when the shape of the first lens 31 has an error and no decentering of the first lens 31 has occurred. In each of FIGS. 6A, 6B and 6C, the amount of the curvature of field is normalized with respect to the focal shift amount on the optical axis. More specifically, FIG. 6A shows the curvature of field when only the first surface 31a of the first lens 31 has an error in shape, FIG. 6B shows the curvature of field when only the second surface 31b of the first lens 31 has an error in shape, and FIG. 6C shows an actual amount of the curvature of field obtained as a sum of the curvature of field shown in FIGS. 6A and 6B.

From FIGS. 6A, 6B and 6C, it is understood that, although a relatively large amount of curvature of field occurs in each of the cases shown in FIGS. 6A and 6B, the actual amount of curvature of filed is kept at a low level because the curvature of field caused by the first surface 31a and the second surface 31b cancel each other out.

FIGS. 7A, 7B and 7C are graphs illustrating curvature of field caused in the scanning device when the shape of the first lens 31 has an error and the decentering of the first lens 31 corresponding to the size of one beam has also occurred. In each of FIGS. 7A, 7B and 7C, the amount of the curvature of field is normalized with respect to the focal shift amount on the optical axis. More specifically, FIG. 7A shows the curvature of field when only the first surface 31a of the first lens 31 has an error in shape and has been decentered, FIG. 7B shows the curvature of field when only the second surface 31b of the first lens 31 has an error in shape and has been decentered, and FIG. 7C shows an actual amount of the curvature of field obtained as a sum of the curvature of field shown in FIGS. 7A and 7B. As can be seen from FIGS. 7A to 7C, the actual amount of the curvature of field is kept at a low level.

SECOND EXAMPLE

FIG. 8 is a plan view of a scanning device 2 according to a second example. In FIG. 8, to elements which are substantially the same as those shown in FIG. 1, the same reference numbers are assigned and explanations thereof will not be repeated. Table 5 shows a numerical configuration of the scanning device 1 according to the second example. In the second example, the anamorphic lens 13 is formed to be a toric lens having a weak power in the main scanning direction.

TABLE 5

Radius of Circumcircle of Polygonal Mirror = 20 mm
Number of Surfaces of Polygonal Mirror = 4 surfaces
Angle of Incidence = 80°, Maximum Image Height Y = 108 mm
Scanning Coefficient = 112.0 mm, Maximum Deflection Angle Y/K = 1.04 radian

| Surface No. | Ry | Rz | d | n |
|---|---|---|---|---|
| #1 | 363.62 | 33.20 | 4.00 | 1.511 |
| #2 | ∞ | — | 62.36 | |
| #3 | ∞ | — | 11.34 | |
| #4 | −233.87 | — | 6.00 | 1.486 |
| #5 | −39.94 | — | 25.98 | |
| #6 | −236.47 | — | 4.00 | 1.486 |
| #7 | 305.53 | −14.79 | 73.00 | |
| #8 | ∞ | — | — | |

In Table 5, the character "No." indicates surface numbers that are assigned to optical surfaces in the scanning device 1 starting from a front surface (a beam incident surface) of the anamorphic lens 13. The surface Nos. #1 and #2 denote the front surface and a rear surface (a beam emerging surface) of the anamorphic lens 13, respectively. The surfaces Nos. #3 denotes the reflective surface 21 of the polygonal mirror 20. The surface Nos. #4 and #5 denote the front and rear surfaces of the first lens 31, respectively. The surface Nos. #6 and #7 denote the front and rear surfaces of the second lens 32, respectively. The surface No. #8 denotes the scan target surface 40.

Table 6 shows conical coefficients and aspherical coefficients defining the rotationally-symmetrical aspherical surfaces (#4, #5 and #6). Table 7 shows conical coefficients and aspherical coefficients defining the anamorphic aspherical surface (#7).

TABLE 6

| | Surface #4 | Surface #5 | Surface #6 |
|---|---|---|---|
| κ | −4.642E−06 | 1.181E−05 | 1.397E−06 |
| A4 | 1.501E−08 | −1.502E−08 | −4.059E−10 |
| A6 | −1.505E−11 | 9.633E−12 | −3.333E−14 |
| A8 | −2.129E−14 | 0.000E+00 | 0.000E+00 |
| A10 | 4.115E−17 | 0.000E+00 | 0.000E+00 |

TABLE 7

| i | AM | AS |
|---|---|---|
| 1 | 0.000E+00 | 3.253E−05 |
| 2 | 0.000E+00 | 3.605E−05 |
| 3 | 0.000E+00 | 0.000E+00 |
| 4 | −2.603E−06 | −2.585E−08 |
| 5 | 0.000E+00 | 0.000E+00 |
| 6 | 1.620E−09 | 1.068E−11 |
| 7 | 0.000E+00 | 0.000E+00 |
| 8 | −7.499E−13 | −2.257E−15 |
| 9 | 0.000E+00 | 0.000E+00 |
| 10 | 1.767E−16 | 0.000E+00 |
| 11 | 0.000E+00 | 0.000E+00 |
| 12 | −2.232E−20 | 0.000E+00 |

Table 8 shows values defining the above mentioned conditions.

TABLE 8

| $f_A$ | 711.59 | $1/f_0$ | 0.008143 |
|---|---|---|---|
| $f_1$ | 102.98 | $1/f_P$ | 0.006630 |
| L | 73.7 | $f_P f_0$ | 0.8141 |
| $y_{1\_0}$ | 1.040 | $y_{1\_max}$ | 17.208 |
| $y'_{1\_0}$ | −0.834 | $y'_{1\_max}$ | 14.328 |
| $y_{2\_0}$ | 1.043 | $y_{2\_max}$ | 19.307 |
| $y'_{2\_0}$ | −0.836 | $y'_{2\_max}$ | 16.849 |

From the values shown in Table 8, $S_1=1.56$ and $S_2=1.14$ hold. Therefore, $(S_1-S_2)$ of the condition (A) is 0.43, the left side term (the lower limit) of the condition (B) is 0.56, and the right side term (the upper limit) of the condition (C) is 1.73. The scanning device 2 according to the second example satisfies the conditions (A), (B), (C), (D) and (E).

FIGS. 9A, 9B and 9C are graphs illustrating curvature of field caused in the scanning device when the shape of the first lens 31 has an error and no decentering of the first lens 31 has occurred. In each of FIGS. 9A, 9B and 9C, the amount of the curvature of field is normalized with respect to the focal shift amount on the optical axis. More specifically, FIG. 9A shows the curvature of field when only the first surface 31a of the first lens 31 has an error in shape, FIG. 9B shows the curvature of field when only the second surface 31b of the first lens 31 has an error in shape, and FIG. 9C shows an actual amount of the curvature of field obtained as a sum of the curvature of field shown in FIGS. 9A and 9B.

From FIGS. 9A, 9B and 9C, it is understood that, although a relatively large amount of curvature of field occurs in each of the cases shown in FIGS. 9A and 9B, the actual amount of curvature of filed is kept at a low level because the curvature of field caused by the first surface 31a and the second surface 31b cancel each other out.

FIGS. 10A, 10B and 10C are graphs illustrating curvature of field caused in the scanning device when the shape of the first lens 31 has an error and the decentering of the first lens 31 corresponding to the size of one beam has also occurred. In each of FIGS. 10A, 10B and 10C, the amount of the curvature of field is normalized with respect to the focal shift amount on the optical axis. More specifically, FIG. 10A shows the curvature of field when only the first surface 31a of the first lens 31 has an error in shape and has been decentered, FIG. 10B shows the curvature of field when only the second surface 31b of the first lens 31 has an error in shape and has been decentered, and FIG. 10C shows an actual amount of the curvature of field obtained as a sum of the curvature of field shown in FIGS. 10A and 10B. As can be seen from FIGS. 10A to 10C, the actual amount of the curvature of field is kept at a low level.

COMPARATIVE EXAMPLE

FIG. 11 is a plan view of a scanning device 3 according to a comparative example designed to evaluate the configuration of the scanning device according to the embodiment. In FIG. 11, to elements which are substantially the same as those shown in FIG. 1, the same reference numbers are assigned and explanations thereof will not be repeated. Table 9 shows a numerical configuration of the scanning device 3 according to the comparative example. In the second example, the anamorphic lens 13 is formed to be a cylindrical lens having no power in the main scanning direction.

TABLE 9

| Radius of Circumcircle of Polygonal Mirror = 20 mm |
| Number of Surfaces of Polygonal Mirror = 4 surfaces |
| Angle of Incidence = 80°, Maximum Image Height Y = 108 mm |
| Scanning Coefficient = 112.0 mm, Maximum Deflection Angle Y/K = 1.04 radian |

| Surface No. | Ry | Rz | d | n |
| --- | --- | --- | --- | --- |
| #1 | ∞ | 33.20 | 4.00 | 1.511 |
| #2 | ∞ | — | 62.36 | |
| #3 | ∞ | — | 11.52 | |
| #4 | −211.93 | — | 7.84 | 1.486 |
| #5 | −35.62 | — | 30.06 | |
| #6 | −290.05 | — | 4.00 | 1.486 |
| #7 | 210.16 | −14.79 | 71.41 | |
| #8 | ∞ | — | | |

In Table 9, the character "No." indicates surface numbers that are assigned to optical surfaces in the scanning device 1 starting from a front surface (a beam incident surface) of the anamorphic lens 13. The surface Nos. #1 and #2 denote the front surface and a rear surface (a beam emerging surface) of the anamorphic lens 13, respectively. The surfaces Nos. #3 denotes the reflective surface 21 of the polygonal mirror 20. The surface Nos. #4 and #5 denote the front and rear surfaces of the first lens 31, respectively. The surface Nos. #6 and #7 denote the front and rear surfaces of the second lens 32, respectively. The surface No. #8 denotes the scan target surface 40.

Table 10 shows conical coefficients and aspherical coefficients defining the rotationally-symmetrical aspherical surfaces (#4, #5 and #6). Table 11 shows conical coefficients and aspherical coefficients defining the anamorphic aspherical surface (#7).

TABLE 10

| | Surface #4 | Surface #5 | Surface #6 |
| --- | --- | --- | --- |
| κ | | | |
| A4 | | | |
| A6 | | | |
| A8 | | 0.000E+00 | 0.000E+00 |
| A10 | | 0.000E+00 | 0.000E+00 |

TABLE 11

| i | AM | AS |
| --- | --- | --- |
| 1 | 0.000E+00 | 2.566E−05 |
| 2 | 0.000E+00 | 1.901E−05 |
| 3 | 0.000E+00 | 0.000E+00 |
| 4 | −2.694E−06 | −1.658E−08 |
| 5 | 0.000E+00 | 0.000E+00 |
| 6 | 1.407E−09 | 7.028E−12 |
| 7 | 0.000E+00 | 0.000E+00 |
| 8 | −7.372E−13 | −1.592E−15 |
| 9 | 0.000E+00 | 0.000E+00 |
| 10 | 2.121E−16 | 0.000E+00 |
| 11 | 0.000E+00 | 0.000E+00 |
| 12 | −2.951E−20 | 0.000E+00 |

Table 12 shows values defining the above mentioned conditions.

TABLE 12

| $f_A$ | ∞ | | |
| --- | --- | --- | --- |
| $f_1$ | 105.47 | | |
| L | 73.88 | | |
| $y_{1\_0}$ | 0.925 | $y_{1\_max}$ | 18.869 |
| $y'_{1\_0}$ | −0.835 | $y'_{1\_max}$ | 15.782 |
| $y_{2\_0}$ | 0.936 | $y_{2\_max}$ | 21.054 |
| $y'_{2\_0}$ | −0.845 | $y'_{2\_max}$ | 18.642 |

From the values shown in Table 12, $S_1$=3.08 and $S_2$=1.83 hold. Therefore, $(S_1-S_2)$ of the condition (A) is 1.24, the left side term (the lower limit) of the condition (B) is 0.56, and the right side term (the upper limit) of the condition (C) is 1.74. The scanning device 3 according to the comparative example satisfies only the conditions (D) and (E), and does not satisfy the conditions (A), (B) and (C).

FIGS. 12A, 12B and 12C are graphs illustrating curvature of field caused in the scanning device 3 when the shape of the first lens 31 has an error and no decentering of the first lens 31 has occurred. In each of FIGS. 12A, 12B and 12C, the amount of the curvature of field is normalized with respect to the focal shift amount on the optical axis. More specifically, FIG. 12A shows the curvature of field when only the first surface 31a of the first lens 31 has an error in shape, FIG. 12B shows the curvature of field when only the second surface 31b of the first lens 31 has an error in shape, and FIG. 12C shows an actual amount of the curvature of field obtained as a sum of the curvature of field shown in FIGS. 12A and 12B.

From FIGS. 12A, 12B and 12C, it is understood that, since the amount of curvature of field caused by the error of the first surface 31a is large, the curvature of field caused by the first surface can not be canceled by the curvature of field caused by the error of the second surface and therefore a relatively large amount of curvature of field remains in the sum of the curvature of field show in FIG. 12C.

FIGS. 13A, 13B and 13C are graphs illustrating curvature of field caused in the scanning device 3 when the shape of the first lens 31 has an error and the decentering of the first lens 31 corresponding to the size of one beam has also occurred. In each of FIGS. 13A, 13B and 13C, the amount of the curvature of field is normalized with respect to the focal shift amount on the optical axis. More specifically, FIG. 13A shows the curvature of field when only the first surface 31a of the first lens 31 has an error in shape and has been decentered, FIG. 13B shows the curvature of field when only the second surface 31b of the first lens 31 has an error in shape and has been decentered, and FIG. 13C shows an actual amount of the curvature of field obtained as a sum of the curvature of field shown in FIGS. 13A and 13B. As can be seen from FIGS. 13A to 13C, a relatively large amount of curvature of field occurs in a peripheral region because the scanning device 3 does not satisfy the condition (C).

It is understood that by satisfying the above mentioned conditions, the scanning device according to the embodiment is able to decrease the curvature of field caused when a lens in the image forming optical system has an error in shape.

This application claims priority of Japanese Patent Applications No. P2006-003808 filed on Jan. 11, 2006. The entire subject matter of the application is incorporated herein by reference.

What is claimed is:

1. A scanning device, comprising:
a light source unit that emits a light beam;
a collection optical system that converges the light beam emitted by the light source unit;
a deflector that deflects the light beam converged by the collection optical system;
an image forming optical system that converges the light beam deflected by the deflector onto a scan target surface to form a beam spot scanning in a main scanning direction,
wherein the scanning device satisfies a following condition:

$$-1 < S_1 - S_2 < 1 \quad (A)$$

where $$S_1 = \frac{(y_{1\_max} - y'_{1\_max})^2}{(y_{1\_0} - y'_{1\_0})^2} \times \frac{\left(\frac{1}{L_1} + \frac{1}{L\cos\theta}\right)^2}{\left(\frac{1}{L_1} + \frac{1}{L}\right)^2},$$

$$S_2 = \frac{(y_{2\_max} - y'_{2\_max})^2}{(y_{2\_0} - y'_{2\_0})^2} \times \frac{\left(\frac{1}{L_1} + \frac{1}{L\cos\theta}\right)^2}{\left(\frac{1}{L_1} + \frac{1}{L}\right)^2},$$

$y_{1\_max}$ represents a height from an optical axis of the image forming optical system to a position at which an outer edge light ray of the light beam proceeding to a maximum image height enters a first surface of a max-power lens having a maximum power in the main scanning direction of all lenses in the image forming optical system,
$y'_{1\_max}$ represents a height from the optical axis to a position at which an inner edge light ray of the light beam proceeding to the maximum image height enters the first surface,
$y_{1\_0}$ represents a height from the optical axis to a position at which the outer edge light ray of the light beam proceeding to a scanning center enters the first surface,
$y'_{1\_0}$ represents a height from the optical axis to a position at which the inner edge light ray of the light beam proceeding to the scanning center enters the first surface,
$y_{2\_max}$ represents a height from the optical axis to a position at which the outer edge light ray of the light beam proceeding to the maximum image height enters a second surface of the max-power lens,
$y'_{2\_max}$ represents a height from the optical axis to a position at which the inner edge light ray of the light beam proceeding to the maximum image height enters the second surface,
$y_{2\_0}$ represents a height from the optical axis to a position at which the outer edge light ray of the light beam proceeding to the scanning center enters the second surface,
$y'_{2\_0}$ represents a height from the optical axis to a position at which the inner edge light ray of the light beam proceeding to the scanning center enters the second surface,
$\theta$ represents an angle formed between the optical axis and a chief ray of the light beam proceeding, immediately after deflection by the deflector, to the maximum image height,
L represents a distance between the first surface and a position of an image formed in the main scanning direction by an optical system located on the light source unit side of the max-power lens, and
$L_1$ represents a distance between the second surface and the scan target surface.

2. The scanning device according to claim 1,
wherein an optical system between the light source unit and the deflector includes:
a collimator lens which converts the light beam from the light source unit into a collimated beam; and
the collection optical system,
wherein the scanning device is configured such that is $f_A$ represents a focal length of the collection optical system in the main scanning direction and $L_0$ represents a distance from the collection optical system to the first surface along the optical axis, $L=-(L_0-f_A)$ holds.

3. The scanning device according to claim 1, wherein the max-power lens having the maximum power in the main scanning direction is configured to be a positive lens satisfying a following condition:

$$1/r_1 > 1/r_2 \quad (D)$$

where $r_1$ represents a radius of curvature in a paraxial region of the first surface, and $r_2$ represents a radius of curvature in a paraxial region of the second surface.

4. The scanning device according to claim 3, wherein the max-power lens satisfies a following condition:

$$1/r_1 \leq 0 \quad (E).$$

5. The scanning device according to claim 1, wherein the angle $\theta$ is larger than or equal to 45°.

6. A scanning device, comprising:
a light source unit that emits a light beam;
a collection optical system that converges the light beam emitted by the light source unit principally in an auxiliary scanning direction;
a deflector that deflects the light beam converged by the collection optical system;

an image forming optical system that converges the light beam deflected by the deflector onto a scan target surface to form a beam spot scanning in a main scanning direction which is perpendicular to the auxiliary scanning direction, wherein the scanning device satisfies a following condition:

$$\frac{(1+\cos\theta)^2}{4} < S_1 < 2 \qquad (B)$$

where $$S_1 = \frac{(y_{1\_max} - y'_{1\_max})^2}{(y_{1\_0} - y'_{1\_0})^2} \times \frac{\left(\frac{1}{L_1} + \frac{1}{L\cos\theta}\right)^2}{\left(\frac{1}{L_1} + \frac{1}{L}\right)^2},$$

$y_{1\_max}$ represents a height from an optical axis of the image forming optical system to a position at which an outer edge light ray of the light beam proceeding to a maximum image height enters a first surface of a max-power lens having a maximum power in the main scanning direction of all lenses in the image forming optical system, $y'_{1\_max}$ represents a height from the optical axis to a position at which an inner edge light ray of the light beam proceeding to the maximum image height enters the first surface, $y_{1\_0}$ represents a height from the optical axis to a position at which the outer edge light ray of the light beam proceeding to a scanning center enters the first surface, $y'_{1\_0}$ represents a height from the optical axis to a position at which the inner edge light ray of the light beam proceeding to the scanning center enters the first surface, $\theta$ represents an angle formed between the optical axis and a chief ray of the light beam proceeding, immediately after deflection by the deflector, to the maximum image height, L represents a distance between the first surface and a position of an image formed in the main scanning direction by an optical system located on the light source unit side of the max-power lens, and $L_1$ represents a distance between the second surface of the max-power lens and the scan target surface.

7. The scanning device according to claim 6, wherein the scanning device satisfies a following condition:

$$S_1 < 2\left(\frac{y_{1\_max}}{2y_{1\_max} - y'_{1\_max}}\right)^2. \qquad (C)$$

8. The scanning device according to claim 6, wherein an optical system between the light source unit and the deflector includes:

a collimator lens which converts the light beam from the light source unit into a collimated beam; and the collection optical system, wherein the scanning device is configured such that is $f_A$ represents a focal length of the collection optical system in the main scanning direction and $L_0$ represents a distance from the collection optical system to the first surface along the optical axis, $L=-(L_0-f_A)$ holds.

9. The scanning device according to claim 6, wherein the max-power lens having the maximum power in the main scanning direction is configured to be a positive lens satisfying a following condition:

$$1/r_1 > 1/r_2 \qquad (D)$$

where $r_1$ represents a radius of curvature in a paraxial region of the first surface, and $r_2$ represents a radius of curvature in a paraxial region of the second surface.

10. The scanning device according to claim 9, wherein the max-power lens satisfies a following condition:

$$1/r_1 \leq 0 \qquad (E).$$

11. The scanning device according to claim 6, wherein the angle $\theta$ is larger than or equal to 45°.

* * * * *